United States Patent
Onoe et al.

(10) Patent No.: US 7,304,111 B2
(45) Date of Patent: Dec. 4, 2007

(54) POLYPROPYLENE CONTAINING COPOLYMER COMPOSITION AND PROCESS FOR PRODUCING THE SAME

(75) Inventors: Masato Onoe, Mie (JP); Kazuyuki Hata, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/207,932

(22) Filed: Aug. 22, 2005

(65) Prior Publication Data

US 2006/0025535 A1  Feb. 2, 2006

Related U.S. Application Data

(63) Continuation of application No. PCT/JP04/001879, filed on Feb. 19, 2004.

(30) Foreign Application Priority Data

Feb. 21, 2003  (JP) .............. 2003-043675

(51) Int. Cl.
C08F 255/02 (2006.01)
C08L 51/06 (2006.01)
(52) U.S. Cl. ............ 525/323; 525/285; 525/322; 525/240; 525/74; 525/78; 525/80; 525/69
(58) Field of Classification Search ........ 525/323, 525/285, 322, 240, 74, 78, 80, 69, 71, 191, 525/222
See application file for complete search history.

(56) References Cited

U.S. PATENT DOCUMENTS

| | | | |
|---|---|---|---|
| 5,180,766 A | 1/1993 | Hayama et al. | |
| 5,451,642 A * | 9/1995 | Abe et al. ............... | 525/179 |
| 5,534,595 A | 7/1996 | Asanuma et al. | |
| 6,001,933 A * | 12/1999 | Tsuruoka et al. ........ | 525/232 |
| 6,031,048 A | 2/2000 | Evans et al. | |
| 6,887,943 B2 | 5/2005 | Onoe et al. | |
| 2004/0162403 A1 | 8/2004 | Shimizu et al. | |
| 2005/0075441 A1 | 4/2005 | Onoe et al. | |
| 2005/0124753 A1 | 6/2005 | Ashihara et al. | |
| 2005/0131160 A1 | 6/2005 | Shimizu et al. | |

FOREIGN PATENT DOCUMENTS

| | | |
|---|---|---|
| CN | 1417236 | 5/2003 |
| EP | 0 403 866 A1 | 12/1990 |
| EP | 0 636 653 A1 | 2/1995 |
| EP | 1 308 470 A2 | 5/2003 |
| JP | 60-233131 | 11/1985 |
| JP | 3-179004 | 8/1991 |
| JP | 3-229772 | 10/1991 |
| JP | 4-20538 | 1/1992 |
| JP | 6-239946 | 8/1994 |
| JP | 8-59757 | 3/1996 |
| JP | 8-277367 | 10/1996 |
| JP | 8-283343 | 10/1996 |
| JP | 2000-515903 | 11/2000 |
| JP | 2003-321640 | 11/2003 |
| WO | WO 97/03108 | 1/1997 |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

A problem of the invention is to provide a propylene copolymer which is excellent in adhesion to crystalline propylene-based polymers and which is excellent in solubility and compatibility with polar resins, a process for producing the same, and a composition containing the subject polypropylene copolymer.

The invention is concerned with a polypropylene copolymer, which is characterized by having a polymer principal chain (A) derived from a propylene-based polymer having (1) a prescribed requirement as defined by the $^{13}$C-NMR spectral measurement and having (2) a melting point [Tm] by a differential scanning calorimeter of not higher than 100° C., or a crystal melting heat of less than 5 J/g; and a side chain containing a polymer chain (B) which is different from the principal chain, with a weight ratio of (A)/(B) being in the range of from 20/1 to 1/20, a composition containing the subject copolymer, and a process for producing the subject copolymer.

10 Claims, No Drawings

POLYPROPYLENE CONTAINING COPOLYMER COMPOSITION AND PROCESS FOR PRODUCING THE SAME

TECHNICAL FIELD

The present invention relates to a polypropylene copolymer which has good compatibility with polar resins and which is useful for use as a surface treating agent, an adhesive, or a paint, etc. against crystalline olefin-based polymers, a composition containing the same and a process for producing the same.

The present application is a continuation of International Application PCT/JP04/001879, filed Feb. 19, 2004, which claims priority to Japanese Patent Application No. 2003-043675 filed Feb. 21, 2003.

BACKGROUND ART

Since propylene polymers and propylene/α-olefin copolymers are not only inexpensive but also excellent in mechanical physical properties, heat resistance, chemical resistance, water resistance, etc., they are used over wide fields. However, since such propylene-based polymers do not have a polar group in the molecule thereof, they are generally low in polarity and involve a drawback that painting or adhesion is difficult. For the purpose of remedying this drawback, there have been attempted various measures such as chemical treatment of the surface of a molded article of the subject propylene polymer with a chemical and oxidation treatment of the surface of the molded article by means of corona discharge treatment, plasma treatment, flame treatment, etc. Nevertheless, according to these methods, not only special units are required, but also it cannot be said that an improving effect of painting properties or adhesion properties is satisfactory.

Then, as a device for imparting good painting properties or adhesion properties to propylene-based polymers by a relatively simple method, there have been developed so-called chlorinated polypropylene and acid-modified propylene/α-olefin copolymers. In general, since isotactic polypropylene is insoluble in solvents, there has been made a device in which the isotactic polypropylene is chlorinated, or propylene is copolymerized with an α-olefin to lower crystallinity, thereby revealing solubility. Also, since the crystallinity is reduced by applying acid modification, resins having relatively good solubility due to the acid modification were obtained. However, there was encountered a problem that following an increase of the modification amount, adhesion properties with a polypropylene-based resin is inferior so that solubility and adhesion are contrary to each other. Also, in addition to this problem, there was encountered a problem that when such a resin is used in a paint, etc., compatibility with polar resins is low so that the resin cannot be mixed with an acrylic resin, etc.

In JP-A-3-229772, a resin obtained by graft co-polymerizing a reactive unsaturated compound having at least one of a hydroxyl group, a glycidyl group, and an amino group on an acid-modified propylene/α-olefin copolymer is shown as a resin having improved compatibility, and a coating composition for polyolefin-based resin containing this resin is also disclosed. However, while this composition is improved with respect to the solubility and compatibility by applying modification such as copolymerization with an α-olefin copolymer, acid modification, and grafting of a polar resin to the resin to be contained therein, there is pointed out a problem that it is inferior in adhesion.

DISCLOSURE OF THE INVENTION

The invention is to provide a polypropylene copolymer which is able to impart satisfactory adhesion properties and painting properties to crystalline propylene-based polymers and which is excellent in solubility and compatibility with polar resins, a process for producing the same and a composition containing the subject polypropylene copolymer, especially an aqueous dispersion.

In order to solve the foregoing problems, the present inventors made extensive and intensive investigations. As a result, they have reached the invention. Specifically, the gist of the invention resides in a polypropylene copolymer, which is characterized by having a polymer principal chain (A) derived from a propylene-based polymer having the following characteristics (1) and (2) and a side chain containing a polymer chain (B) which is different from the principal chain, with a weight ratio of (A)/(B) being in the range of from 20/1 to 1/20, and a process for producing the subject copolymer.

(1) When a peak derived from a carbon atom of a methyl group of a propylene unit sequence segment comprising a head to tail bond is observed by $^{13}$C-NMR and a chemical shift of a peak top of a peak assigned to a pentad expressed by (mmmm) is defined as 21.8 ppm, a ratio of an area $S_1$ of a peak whose peak top appears at 21.8 ppm to a total area S of peaks appearing at from 19.8 ppm to 22.2 ppm ($S_1/S$) is from 20% to 60%; and when an area of a peak (mmmr) whose peak top appears at from about 21.5 to 21.7 ppm is defined as $S_2$, there is the relationship of $\{(4+2S_1/S_2)>5\}$.

(2) A melting point [Tm] of the propylene-based polymer as measured by a differential scanning calorimeter is not higher than 100° C., or a crystal melting heat does not stand at 5 J/g or more.

Also, another gist of the invention resides in the foregoing polypropylene copolymer, which is characterized by having the following characteristics (a) to (c) and a composition and an aqueous dispersion each containing the subject copolymer.

(a) When dissolved in toluene at 25° C. together with polymethyl methacrylate in a weight ratio of 50/50 and in a concentration of solids of 12% by weight, transmittance (at 650 nm) is 80% or more.

(b) When dissolved in toluene at 25° C. in a concentration of 10% by weight, the content of an insoluble matter is not more than 1% by weight based on the whole of polymers.

(c) Adhesion by an adhesion test (cross-cut tape test) to a polypropylene substrate is 50/100 or more.

BEST MODE FOR CARRYING OUT THE INVENTION

The invention will be described below in detail.

In the polypropylene copolymer of the invention, the polymer principal chain (A) is derived from a polypropylene-based polymer having specific physical properties expressed by the foregoing characteristics (1) and (2); and for example, it is derived from a modified propylene-based polymer resulting from modification of a propylene-based polymer having the characteristics (1) and (2) but not having a functional group with an acid, etc., or a propylene-based polymer having the characteristics (1) and (2) and having a functional group, such as copolymers of propylene and a functional group-containing monomer, and preferably one derived from a propylene-based polymer modified with an acid, etc.

The propylene-based polymer which does not have a functional group to be modified may be a propylene homopolymer or a copolymer with other monomer. Examples of other monomer include olefinic hydrocarbons such as ethylene, butene, 1-pentene, 1-hexene, and 1-octene.

Examples of the propylene-based polymer having a functional group inclusive of copolymers include copolymers of propylene with a monomer having a group such as a carboxyl group, a hydroxyl group, an amino group, an epoxy group, and an isocyanate group. Examples of such a monomer include (meth)acrylic acid, 2-hydroxyethyl (meth)acrylate, glycidyl (meth)acrylate, (meth)acrylamide, (dimethylamino)ethyl (meth)acrylate, (2-isocyanato)ethyl (meth)acrylate, and maleic anhydride. It is also possible to obtain functional group-containing propylene-based polymers by using a terminator or a chain transfer agent other than copolymerization. As the terminator, the foregoing monomers can be used.

The propylene content of the propylene-based polymer in the invention is preferably 80% by mole or more, more preferably 90% by mole or more, further preferably 95% by mole or more, and most preferably 98% by mole or more. When the propylene content in the propylene-based polymer is less than 80% by mole, there may be the case where adhesion to a crystalline propylene-based resin as a substrate is reduced.

It is preferable that the propylene-based polymer in the invention has a weight average molecular weight Mw, as measured by GPC (Gel Permeation Chromatography), of from 5,000 to 200,000. In the case where the Mw is less than 5,000, not only deterioration of film forming properties of the targeted polypropylene copolymer after coating, which is obtained by the subject polymer, becomes remarkable, but also stickiness is remarkable, and therefore, such is not preferable. Furthermore, in the case where the Mw exceeds 200,000, though there is no serious problem with respect to the film forming properties and stickiness, when the polymer is dissolved in a solvent, the viscosity becomes too high so that inconvenience is generated on the production or handling of a polymer solution, and therefore, such is not preferable. In the invention, while the range of the weight average molecular weight Mw is from 5,000 to 200,000, it is preferably from 10,000 to 180,000, and more preferably from 20,000 to 150,000.

Incidentally, the measurement of GPC can be carried out by conventionally known methods by using o-dichlorobenzene, etc. as a solvent and polystyrene as a standard sample and using a commercially available unit.

Though the molecular weight distribution of the propylene-based polymer in the invention is not particularly limited, it is desired to avoid the excessively broad molecular weight distribution because it is meant that the content of low-molecular weight components is inevitably high. In the case where Mw/Mn which is a ratio of the weight average molecular weight Mw to the number average molecular weight Mn is employed as an index of the molecular weight distribution, ones whose Mw/Mn is preferably less than 20, more preferably less than 10, and most preferably less than 5 are suitably used.

As the characteristic features of the propylene-based polymer in the invention, there can be enumerated the matters that a highly crystalline block and a highly amorphous block are copresent in the principal chain thereof and that the highly crystalline block is of a structure which is rich in isotacticity. However, when the content of the highly crystalline block is too high, the solubility in a solvent becomes worse, and therefore, the balance between the highly crystalline block and the highly amorphous block is important. In the invention, when a requirement to be defined by the $^{13}$C-NMR spectrum is applied as a part of the index expressing this balance and this requirement meets the foregoing prescribed ranges, an excellent structural characteristic is revealed.

The measurement method of the $^{13}$C-NMR spectrum in the invention is as follows.

A sample of 350 to 500 mg is completely dissolved by using about 2.2 mL of o-dichlorobenzene in a 10-mmϕ sample tube for NMR. Next, about 0.2 mL of deuterobenzene is added as a lock solvent, and after homogenization, the measurement is carried out at 130° C. by a proton complete decoupling method. The measurement condition is set up such that a flip angle is 90° and that a pulse separation is $5T_1$ or more ($T_1$ stands for the longest value with respect to the spin-lattice relaxation time of the methyl group). In the propylene-based polymer, the spin-lattice relaxation time of the methylene group and methine group is shorter than that of the methyl group, and therefore, recovery of the magnetization of all carbons is 99% or more under this measurement condition. Incidentally, in order to increase a quantitative precision, it is preferred to achieve integration for 20 hours or more by using an NMR unit having a resonance frequency of a $^{13}$C nucleus of 125 MHz or more.

With respect to the chemical shift, among ten kinds of pentads (mmmm, mmmr, rmmr, mmrr, mmrm, rmrr, rmrm, rrrr, rrrm, and mrrm) of a propylene unit sequence segment comprising a head to tail bond, a chemical shift of a peak based on the third methyl group of the propylene unit pentad sequences expressed by (mmmm), that is, the absolute configurations of the methyl branch are all identical, is defined as 21.8 ppm, and chemical shifts of other carbon peaks are determined based on this. According to this basis, for other propylene unit pentad sequences, the chemical shifts are approximately determined as follows. That is, mmmr: 21.5 to 21.7 ppm, rmmr: 21.3 to 21.5 ppm, mmrr: 21.0 to 21.1 ppm, mmrm and rmrr: 20.8 to 21.0 ppm, rmrm: 20.6 to 20.8 ppm, rrrr: 20.3 to 20.5 ppm, rrrm: 20.1 to 20.3 ppm, and mrrm: 19.9 to 20.1 ppm. Incidentally, the assignment should be achieved while taking into consideration the matter that not only the chemical shifts of peaks derived from these pentads somewhat fluctuate depending upon the measurement condition of NMR, but also the peak is not always a single peak but often shows a complicated split pattern based on a minute structure.

In the propylene-based polymer according to the invention, when the chemical shift of a peak top of a peak assigned to the foregoing pentad expressed by (mmmm) is defined as 21.8 ppm, a ratio ($S_1/S$) of an area $S_1$ of a peak whose peak top appears at 21.8 ppm to a total area S of peaks assigned to the foregoing pentads appearing in the range of from 19.8 ppm to 22.2 ppm, namely all of the pentads, mmmm, mmmr, rmmr, mmrr, mmrm, rmrr, rmrm, rrrr, rrrm, and mrrm, is from 20% to 60%; and when an area of a peak (mmmr) whose peak top appears at from about 21.5 to 21.7 ppm is defined as $S_2$, there is the relationship of $\{(4+2S_1/S_2)>5\}$.

These requirements are related to the matters that a highly crystalline block and a highly amorphous block are copresent in the principal chain of the propylene-based polymer and that the highly crystalline block is rich in isotacticity. Incidentally, in the case where the ratio of $S_1$ to S is less than 20%, not only the crystallinity is too low so that sufficient adhesion properties are not obtained, but also a problem such as stickiness likely occurs, and therefore, such is not preferable. On the other hand, in the case where the ratio of $S_1$ to S exceeds 60%, the crystallinity is too high so that the solubility in a solvent is lowered, and therefore, such is not preferable, either. While the ratio of $S_1$ to S as defined in the invention is from 20% to 60%, it is preferably from 25% to 55%, and more preferably from 25% to 50%.

Furthermore, the propylene-based polymer in the invention must be satisfied with the relationship of $\{(4+2S_1/S_2)>5\}$. This relational expression is closely related to an index named as an isotactic block index (BI) by Waymouth, et al. (see JP-T-9-510745). BI is an index for expressing stereoblock properties of the polymer and is defined as $\{BI=4+2[mmmm]/[mmmr]\}$. More specifically, BI represents an average sequence length of an isotactic block having four or more propylene units (J. W. Collete, et al., *Macromol.*, 22, 3858 (1989); and J. C. Randall, *J. Polym. Sci. Polym. Phys. Ed.*, 14, 2083 (1976)). In the case of statistically complete atactic polypropylene, BI is 5. Accordingly, it is meant by $\{4+2 [mmmm]/[mmmr]>5\}$ that the average sequence length of the isotactic block to be contained in the polymer is longer than that of the atactic polypropylene.

Though the requirement $(4+2S_1/S_2)$ in the propylene-based polymer according to the invention is not completely identical with the foregoing BI, it is approximately corresponding thereto. Accordingly, it is meant by the requirement $\{(4+2S_1/S_2)>5\}$ that the polymer of the invention is different from the atactic polypropylene and contains an isotactic block having a crystallizable sequence length. Furthermore, the isotactic block is present which means that a block comprising a sequence of disordered stereospecificity is also simultaneously present in the principal chain.

In the light of the above, the propylene-based polymer of the invention has a peculiar structure in which a crystalline block and an amorphous block are copresent in the principal chain thereof, and the crystalline block is formed of an isotactic block having a relatively long average sequence length and is of a structure which is rich in isotactic block properties. In the propylene-based polymer of the invention, while the $(4+2S_1/S_2)$ is more than 5, it is preferably more than 6 and less than 25, and more preferably more than 7 and less than 10.

It is meant by $\{(4+2S_1/S_2)>5\}$ that the average sequence length of the isotactic block to be contained in the polymer is not excessively large. When the average sequence length of the isotactic block is too large, the solubility of the polymer in a solvent is lowered, and therefore, such is not preferable.

The propylene-based polymer of the invention is required such that its melting point [Tm] as measured by a differential scanning calorimeter is not higher than 100° C., or its crystal melting heat does not stand at 5 J/g or more. The melting point is related to the matter that the crystalline block structure and the amorphous block structure are uniform and are randomly present. Accordingly, in the propylene-based polymer in which the melting point [Tm] is not higher than 100° C., or the crystal melting heat does not stand at 5 J/g or more, the solubility of a propylene copolymer formed of the propylene-based polymer in a solvent is good so that it is easy to form a coating solution, and in forming an aqueous dispersion, it is easy to achieve mechanical emulsification or phase inversion emulsification from a solution or a melt. The case where [Tm] exceeds 100° C. is not preferable in view of the solubility in a solvent, etc. because the crystallinity is too high.

With respect to the production process of the propylene-based polymer of the invention, any production process may be employed so far as it is possible to produce a polymer which can meet the requirements of the invention. Examples thereof include a method for carrying out polymerization by a Ziegler-Natta catalyst; a method for carrying out polymerization by a single site catalyst or a Kaminsky catalyst; and a method for achieving epimerization of highly stereospecific isotactic polypropylene using a Pd/C catalyst in the presence of hydrogen. As the preferred production process, there can be enumerated a production process by a single site catalyst. This is because in general, a single site catalyst can control microtacticity by means of a design of ligand; polymers having a relatively low molecular weight can be easily produced; and in particular, the molecular weight distribution or stereospecificity distribution is sharp. When the molecular weight distribution or stereospecificity distribution is irregular, a difference in the solubility is revealed, whereby partially insoluble materials are possibly formed.

Furthermore, among the single site catalysts, a metallocene catalyst is suitably used because it can precisely control the microtacticity.

As the single site catalyst for producing the propylene-based polymer of the invention, a metallocene catalyst containing a metallocene compound (component [A]) and a cocatalyst (component [B]) as essential components is preferably used.

As the metallocene compound (component [A]), a transition metal-containing $C_1$-symmetric ansa-metallocene having a crosslinking group is preferable. Though a non-crosslinked metallocene is applicable to the production of the propylene-based polymer of the invention, since the ansa-metallocene having a crosslinking group is generally excellent in heat stability, etc., it is preferable especially from the industrial viewpoint.

The transition metal-containing ansa-metallocene having a crosslinking group which is used in the invention is a $C_1$-symmetric metallocene of a crosslinked transition metal compound of the group 4 having a conjugated 5-membered ring ligand. Such a transition metal compound is known, and it is also known that it is used as a catalyst component for polymerization of an α-olefin.

The metallocene compound as the component [A] is a compound represented by the following general formula (1) and having $C_1$-symmetric properties. Furthermore, a mixture of a plurality of metallocene compounds represented by the subject general formula may be used.

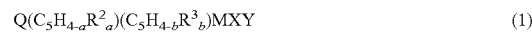

$$Q(C_5H_{4-a}R^2_a)(C_5H_{4-b}R^3_b)MXY \quad (1)$$

In the general formula (1), Q represents a binding group which crosslinks two conjugated 5-membered ring ligands; M represents a transition metal of the group 4 of the periodic table; X and Y each independently represents hydrogen, a halogen, a hydrocarbon group having from 1 to 20 carbon atoms, an oxygen-containing hydrocarbon group having from 1 to 20 carbon atoms, a nitrogen-containing hydrocarbon atoms having from 1 to 20 carbon atoms, a phosphorus-containing hydrocarbon group having from 1 to 20 carbon atoms, or a silicon-containing hydrocarbon group having from 1 to 20 carbon atoms; and $R^2$ and $R^3$ each independently represents a hydrocarbon group having from 1 to 20 carbon atoms, a halogen, a halogen-containing hydrocarbon group having from 1 to 20 carbon atoms, an alkoxy group, an aryloxy group, a silicon-containing hydrocarbon group, a phosphorus-containing hydrocarbon group, a nitrogen-containing hydrocarbon group, or a boron-containing hydrocarbon group. Furthermore, adjacent two $R^2$s and/or $R^3$s may be respectively taken together to form a 4-membered to 10-membered ring. a and b each independently represents an integer which is satisfied with $0 \leq a \leq 4$ and $0 \leq b \leq 4$, respectively.

In particular, dichloro[dimethylsilylene(cyclopenta-dienyl) (2,4-dimethyl-4H-1-azulenyl)]halfnium is the most preferable among the metallocene compounds represented by the foregoing general formula (1). Dichloro[dimethylgermylene(cyclopentadienyl)(2,4-dimethyl-4H-1-azulenyl)]-halfnium and dichloro[dimethylsilylene(2-methyl-1-indenyl)(2,4-dimethyl-4H-1-azulenyl)]halfnium are also suitable catalysts.

Incidentally, a mixture of plural compounds having a different structure may be used as the metallocene compound, and a combination of two or more kinds thereof may be used. It is also possible to auxiliarily use a known solid catalyst containing a titanium trichloride as the major component or a carrier supporting type catalyst containing magnesium, titanium, and a halogen as essential components. Also, the component [A] may be newly supplemented and used at the time of completion of the first stage of the polymerization or prior to start of the polymerization of the second stage.

As the cocatalyst which is used as the component [B] in the invention, at least one substance selected from the group consisting of (1) an organic aluminum oxy compound, (2) an ionic compound capable of converting the component [A] into a cation upon reaction with the transition metal of the component [A], (3) a Lewis acid, and (4) an ion-exchanging stratiform compound exclusive of silicates or an inorganic silicate is used as an essential component.

In the production of the propylene-based polymer of the invention, an organoaluminum compound may be used as an optional component [C] in addition to the cocatalyst as the component [B]. Specifically, the organoaluminum compound is a trialkylaluminum, a halogen- or alkoxy-containing alkylaluminum, or a hydrogen-containing organoaluminum compound. Of these, trialkylaluminums such as trimethylaluminum, triethylaluminum, tripropylaluminum, and triisobutylaluminum are especially preferable. A combination of two or more kinds of these optional components may be used. Also, the optional component [C] may be newly supplemented after start of the polymerization, etc.

The metallocene-based catalyst is obtained by contact of the component [A], the component [B], and the optional component [C], but its contact method is not particularly limited. This contact may be achieved not only at the time of preparation of the catalyst but also at the time of prepolymerization or polymerization of propylene.

The propylene polymer and a solid of an inorganic oxide such as silica and alumina may be made copresent or brought into contact with each other at the time or after the contact of the respective catalyst components.

The contact may be carried out in an inert gas such as nitrogen or in an inert hydrocarbon solvent such as n-pentane, n-hexane, n-heptane, toluene, and xylene. With respect to these solvents, it is preferred to use a solvent which has been subjected to an operation of removal of poisoning substances such as water and sulfur compounds. The contact temperature is from −20° C. to the boiling point of the solvent to be used, and especially preferably from room temperature to the boiling point of the solvent to be used.

The use amounts of the respective catalyst components are not particularly limited. In the case where an ion-exchanging stratiform compound exclusive of silicates, or an inorganic silicate is used as the component [B], the use amount of the component [A] is from 0.0001 to 10 mmoles, and preferably from 0.001 to 5 mmoles, and the use amount of the component [C] is from 0 to 10,000 mmoles, and preferably from 0.01 to 100 mmoles per gram of the component [B]. Also, it is preferable in view of polymerization activity, etc. that an atomic ratio of the transition metal in the component [A] to aluminum in the component [C] is controlled at from 1/0 to 1/1,000,000, and preferably from 1/0.1 to 1/100,000.

The thus obtained catalyst may be washed with an inert hydrocarbon solvent such as n-pentane, n-hexane, n-heptane, toluene, and xylene and then used, or may be used without being washed.

In washing, the component [C] may be newly combined and used as the need arises. The amount of the component [C] which is used in washing is preferably controlled such that an atomic ratio of aluminum in the component [C] to the transition metal in the component [A] is from 1/0 to 1/10,000.

A compound prepared by subjecting propylene to prepolymerization and washing, if desired, can also be used as a catalyst. This prepolymerization may be carried out in an inert gas such as nitrogen or in an inert hydrocarbon solvent such as n-pentane, n-hexane, n-heptane, toluene, and xylene.

The polymerization reaction of propylene is carried out in the presence or absence of a liquid, for example, an inert hydrocarbon such as propane, n-butane, n-hexane, n-heptane, toluene, xylene, cyclohexane, and methylcyclohexane, or liquefied propylene. Above all, it is preferable that the polymerization is carried out in the presence of the foregoing inert hydrocarbon.

Specifically, the propylene polymer is produced in the presence of the component [A] and the component [B], or in the presence of the component [A], the component [B] and the component [C]. Though the polymerization temperature, the polymerization pressure, and the polymerization time are not particularly limited, they are usually optimally set up within the following ranges while taking into consideration the productivity and process ability. That is, the polymerization temperature is selected within the range of usually from 0 to 150° C., and preferably from 20 to 100° C.; the polymerization pressure is selected within the range of from 0.1 to 100 MPa, preferably from 0.3 to 10 MPa, and more preferably from 0.5 to 4 MPa; and the polymerization time is selected within the range of from 0.1 to 10 hours, preferably from 0.3 to 7 hours, and more preferably from 0.5 to 6 hours.

In the invention, as described previously, it is preferred to make the weight average molecular weight Mw of the propylene-based polymer fall within the range of from 5,000 to 200,000. For this purpose, conventionally known methods can be employed for regulating the molecular weight of the polymer. That is, there are enumerated a method for controlling the polymerization temperature to regulate the molecular weight, a method for controlling the monomer concentration to regulate the molecular weight, and a method for using a chain transfer agent to regulate the molecular weight. In the case of using a chain transfer agent, hydrogen is preferable.

Furthermore, in the invention, in the propylene-based polymer as produced by controlling the stereoselectivity of the propylene unit sequence segment comprising a head to tail bond, as described previously, it is required that when a peak derived from a carbon atom of a methyl group of a propylene unit sequence segment comprising a head to tail bond is observed by $^{13}$C-NMR and a chemical shift of a peak top of a peak assigned to a pentad expressed by (mmmm) is defined as 21.8 ppm, a ratio ($S_1/S$) of an area $S_1$ of a peak whose peak top appears at 21.8 ppm to an area $S$ of peaks of all pentads appearing in the range of from 19.8 ppm to 22.2 ppm is from 20% to 60%; and when an area of a peak (mmmr) whose peak top appears at from about 21.5 to 21.7 ppm is defined as $S_2$, there is the relationship of $\{(4+2S_1/S_2)>5\}$.

The method for controlling the stereoselectivity regarding such characteristics of the propylene-based polymer is not particularly limited. However, in general, there are enumerated a method for controlling it by the structure of the catalyst and a method for controlling it by controlling the polymerization condition. In the case where the stereoselectivity is controlled by controlling the polymerization condition, by controlling the polymerization temperature or monomer concentration and optionally, further controlling the structure of the foregoing catalyst, it is possible to obtain a propylene-based polymer having desired stereospecificity.

The polymer principal chain (A) of the propylene copolymer of the invention is derived from the propylene-based polymer having the foregoing characteristics. However, in the case where the propylene-based polymer is a polymer which does not have a functional group (this polymer will be sometimes referred to as "non-functional propylene-based polymer"), such as a propylene homopolymer or a copolymer with an olefinic hydrocarbon, etc., the polymer principal chain (A) is derived from the propylene-based polymer which has been modified with an acid, etc.; and in the case where the propylene-based polymer is a polymer having a functional group (this polymer will be sometimes referred to as "functional propylene-based polymer"), such as a copolymer of propylene and a functional group-containing monomer, the polymer principal chain (A) can be derived as it is without being modified.

The modified propylene-based polymer which is used in the invention is a modified polymer which has the foregoing specific properties (1) and (2) and which can be obtained by graft copolymerizing, for example, a reactive group-containing radical polymerizable unsaturated compound on a non-functional propylene-based polymer, thereby introducing the reactive group into the propylene-based polymer. Examples of the reactive group to be introduced include a carboxyl group, an acid group of a dicarboxylic acid anhydride group, a hydroxyl group, an amino group, an epoxy group, and an isocyanate group. Of these, a carboxyl group and a dicarboxylic acid anhydride group are preferable.

As the reactive group-containing radical polymerizable unsaturated compound, specific examples of ones having a carboxyl group or a dicarboxylic acid anhydride group include (meth)acrylic acid, fumaric acid, maleic acid, maleic anhydride, itaconic acid, itaconic anhydride, crotonic acid, citraconic acid, and citraconic anhydride; specific examples of ones having a hydroxyl group include 2-hydroxyethyl (meth)acrylate and 2-hydroxypropyl (meth)acrylate; specific examples of ones having an amino group include (meth)acrylamide and (dimethylamino)ethyl (meth)acrylate; specific examples of ones having an epoxy group include glycidyl (meth)acrylate; and specific examples of ones having an isocyanate group include (2-isocyanato)ethyl (meth) acrylate. Of these, maleic anhydride is preferable.

As the method for graft copolymerizing a carboxyl group-containing radical polymerizable unsaturated compound on a non-functional propylene-based polymer, there are enumerated a variety of known methods. Examples thereof include a method in which a non-functional propylene-based polymer is dissolved in an organic solvent, the foregoing polymerizable unsaturated compound to be graft copolymerized (hereinafter sometimes referred to as "graft copolymerization component") and a radical polymerization initiator are added, and the mixture is heated with stirring, thereby achieving a graft copolymerization reaction; a method in which a non-functional propylene-based polymer is melted by heating, a polymerizable unsaturated compound to be graft copolymerized and a radical polymerization initiator are added to the subject melt, and the mixture is stirred, thereby achieving graft copolymerization; a method in which respective components of a non-functional propylene-based polymer, a polymerizable unsaturated compound and a radical initiator are supplied into an extruder and kneaded by heating, thereby achieving graft copolymerization; and a method in which a powder of a non-functional propylene-based polymer is dipped in a solution as prepared by dissolving the foregoing polymerizable unsaturated compound to be graft polymerized and a radical polymerization initiator in an organic solvent and heated to a temperature at which the powder is not melted, thereby achieving graft copolymerization.

A grafting rate of the graft copolymerization component by the carboxyl group-containing radical polymerizable unsaturated compound in the modified propylene-based polymer, namely the content thereof in the modified propylene-based polymer is preferably from 0.01 to 5% by weight, and more preferably from 0.1 to 3% by weight. When the grafting rate is less than 0.01% by weight, the polypropylene copolymer derived from this modified propylene polymer becomes worse in adhesion to a primer such as a top coating paint. In contrast, when it is more than 5% by weight, adhesion to a crystalline polyolefin becomes worse.

A use proportion of the radical polymerization initiator to the graft copolymerization component at the time of modification is usually in the range of from 1/100 to 2/1, and preferably from 1/20 to 1/1 in terms of a molar ratio.

The reaction temperature is 50° C. or higher, and especially suitably in the range of from 80 to 200° C.; and the reaction time is from about 2 to 10 hours.

The radical polymerization initiator which is used in the foregoing graft copolymerization can be properly selected and used among usual radical initiators, and examples thereof include organic peroxides and azonitriles. Examples of organic peroxides include diisopropyl peroxide, di(t-butyl) peroxide, t-butyl hydroperoxide, benzoyl peroxide, dicumyl peroxide, cumyl hydroperoxide, dilauroyl peroxide, dibenzoyl peroxide, methyl ethyl ketone peroxide, cyclohexanone peroxide, t-butyl peroxyisopropyl mono-carbonate, diisopropyl peroxycarbonate, and dicyclohexyl peroxycarbonate. Examples of azonitriles include azobisbutyronitrile and azobisisopropylnitrile. Of these, t-butyl peroxyisopropyl monocarbonate, benzoyl peroxide, and dicumyl peroxide are preferable.

In the case where the modification by the foregoing graft copolymerization is carried out by using an organic solvent, specific examples of the organic solvent include aromatic hydrocarbons such as benzene, toluene, and xylene; aliphatic hydrocarbons such as n-hexane, n-heptane, n-octane, and n-decane; and halogenated hydrocarbons such trichloroethylene, perchloroethylene, chlorobenzene, and o-dichlorobenzene. Of these, aromatic hydrocarbons and halogenated hydrocarbons are preferable; and toluene, xylene, and chlorobenzene are especially preferable.

The acid-modified propylene-based polymer in the invention has a weight average molecular weight Mw as measured by GPC of from 5,000 to 200,000. The weight average molecular weight Mw is preferably from 10,000 to 180,000, and more preferably from 20,000 to 150,000.

The polypropylene copolymer of the invention is a polypropylene copolymer having a polymer principal chain (A) derived from a propylene-based polymer having the foregoing characteristics (1) and (2) and a side chain containing a polymer chain (B) which is different from the principal chain in a specific proportion.

While the polymer principal chain (A) is derived from a modified polymer of a non-functional propylene-based polymer or a functional propylene-based polymer, it is preferably derived from an acid-modified propylene-based polymer as modified with an acid having a carboxyl group or a dicarboxylic acid anhydride group; and the polymer chain (B) of the side chain is preferably a polymer chain in which a repeating unit thereof is formed by addition reaction, ester bond, or ether bond. The "polymer chain in which a repeating unit thereof is formed by addition reaction, ester bond, or ether bond" as referred to herein means a (meth)acrylic polymer chain, a polyester-based polymer chain, or a polyether-based polymer chain. The (meth)acrylic polymer chain is specifically a polymer chain as formed by radical polymerizing (meth)acrylic acid and/or a derivative thereof.

The polypropylene copolymer of the invention is preferably a polypropylene copolymer having a polymer principal chain (A) comprising an acid-modified propylene-based polymer as modified with an acid having a carboxyl group or a dicarboxylic acid anhydride group and a side chain containing a polymer chain (B) which is connected via covalent bond or ionic bond with a group capable of reacting with the subject carboxyl group or dicarboxylic acid anhydride group and in which a repeating unit thereof is formed by addition reaction, ester bond, or ether bond.

Examples of a method in which a side chain containing the poly(meth)acrylic polymer chain (B) is connected to the polymer principal chain (A) comprising a functional group-containing propylene-based polymer, especially an acid-modified propylene-based polymer as modified with an acid having a carboxyl group or a dicarboxylic acid anhydride group via binding with a group capable of reacting with the subject carboxyl group or dicarboxylic acid anhydride group include the following methods (1) and (2), and the binding may be formed by any of these methods.

(1) A method for binding the acid-modified propylene-based polymer with a compound (C1) having a group capable of reacting with the carboxyl group or dicarboxylic acid anhydride group of the subject acid-modified propylene-based polymer and a radical polymerizable unsaturated bond in the molecule thereof and then graft copolymerizing a radical polymerizable unsaturated compound (C2) containing at least (meth)acrylic acid and/or a derivative thereof (for example, esters) thereon.

(2) A method for copolymerizing a compound (C1) having a group capable of reacting with the carboxyl group or dicarboxylic acid anhydride group of the acid-modified propylene-based polymer and a radical polymerizable unsaturated bond in the molecule thereof and a radical polymerizable unsaturated compound (C2) containing at least (meth)acrylic acid and/or a derivative thereof (for example, esters) and reacting a formed copolymer with the acid-modified propylene-based polymer.

Examples of the group capable of reacting with the carboxyl group or dicarboxylic acid anhydride group of the acid-modified propylene which the radical polymerizable unsaturated bond-containing compound (C1) has include an amino group, a hydroxyl group, an epoxy group, and an isocyanate group.

Examples of the reaction between such a group and the carboxyl group or dicarboxylic acid anhydride group include an esterification reaction between a carboxylic acid and a hydroxyl group, a ring opening reaction between a carboxylic acid and an epoxy group, an amidation reaction between a carboxylic acid and a primary or secondary amino group, a quaternary ammonification reaction between a carboxylic acid and a tertiary amino group, and a urethanation reaction between a carboxylic acid and an isocyanate group.

In the case where the acid-modified propylene-based polymer is a modified polymer with a dicarboxylic acid anhydride, that acid-modified polymer may be used in a state that it has been subjected to ring opening with water or esterification with an alcohol.

Examples of the compound (C1) having a group capable of reacting with the carboxyl group or dicarboxylic acid anhydride group of the acid-modified propylene-based polymer and a radical polymerizable unsaturated bond in the molecule thereof include the following compounds.

Examples of a hydroxyl group-containing radical polymerizable unsaturated compound include hydroxyalkyl (meth)acrylates such as 2-hydroxyethyl (meth)acrylate, 2-hydroxypropyl (meth)acrylate, and 2-hydroxybutyl (meth)acrylate; (meth)acrylamide N-methylol; (meth)acrylic acid 2-hydroxyethyl-6-hexanolide addition polymers; alkenyl alcohols such as 2-propen-1-ol; alkynyl alcohols such as 2-propyn-1-ol; and hydroxyvinyl ether.

Examples of an epoxy group-containing radical polymerizable unsaturated compound include unsaturated carboxylic acid glycidyl esters such as glycidyl (meth)acrylate, mono- and diglycidyl esters of maleic acid, mono- and diglycidyl esters of itaconic acid, and mono- and diglycidyl esters of allylsuccinic acid; glycidyl esters of a p-styrene carboxylic acid; glycidyl ethers such as allyl glycidyl ether, 2-methylallyl glycidyl ether, and styrene-p-glycidyl ether; p-glycidylstyrene; epoxy olefins such as 3,4-epoxy-1-butene and 3,4-epoxy-3-methyl-1-butene; and vinylcyclohexene monoxide.

Examples of an isocyanate group-containing radical polymerizable unsaturated compound include 2-isocyanatoethyl (meth)acrylate and methacryloyl isocyanate.

Examples of a primary or secondary amino group-containing radical polymerizable unsaturated compound include (meth)acrylamides.

Examples of a tertiary amino group-containing radical polymerizable unsaturated compound include dimethylaminoethyl (meth)acrylate and diethylaminoethyl (meth)acrylate.

Furthermore, it is possible to use an initiator or a chain transfer agent each having a functional group which can be bound with the reactive group of the propylene-based polymer in the molecule thereof in place of C1. Examples of the functional group which can be bound include a hydroxyl group, a glycidyl group, a carboxyl group, and an amino group. Specific examples of the initiator include 2,2'-azobis [2-methyl-N-[1,1-bis-(hydroxymethyl)-2-hydroxyethyl] propionamide] and 2,2'-azo-bis[2-methyl-N-(2-hydroxyethyl)-propionamide]. Specific examples of the chain transfer agent include 2-mercaptoethanol. By using the foregoing initiator or chain transfer agent in the polymerization of a (meth)acrylic monomer, it is possible to take it in the (meth)acrylic polymer chain.

The radical polymerizable compound (C2) is a radical polymerizable compound which can be copolymerized with the compound (C1) having a group capable of reacting with the carboxyl group or dicarboxylic acid anhydride group of the acid-modified propylene-based polymer and a radical polymerizable unsaturated bond in the molecule thereof, and preferably contains at least one of (meth)acrylic acid and/or its derivatives.

As the radical polymerizable compound (C2), specific examples of (meth)acrylic acid or its derivatives (esters)

include (meth)acrylic acid; and (meth)acrylic ester-based monomers having an alkyl group having from 1 to 12 carbon atoms, for example, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, and dodecyl (meth)acrylate.

In addition, there can be enumerated (meth)acrylic ester monomers having an aryl group or an arylalkyl group each having from 1 to 12 carbon atoms, for example, phenyl (meth)acrylate, toluyl (meth)acrylate, and benzyl (meth)acrylate; (meth)acrylic ester monomers having a hetero atom-containing alkyl group having from 1 to 20 carbon atoms, for example, hydroxyethyl (meth)acrylate, dimethylaminoethyl (meth)acrylate, diethylaminoethyl (meth)acrylate, 2-aminoethyl (meth)acrylate, 2-methoxyethyl (meth)acrylate, 3-methoxypropyl (meth)-acrylate, glycidyl (meth)acrylate, and a (meth)acrylic acid ethylene oxide adduct; (meth)acrylic ester monomers having a fluorine atom-containing alkyl group having from 1 to 20 carbon atoms, for example, trifluoromethylmethyl (meth)acrylate, 2-trifluoromethylethyl (meth)acrylate, and 2-perfluoroethylethyl (meth)acrylate; and (meth)acrylamide-based monomers, for example, (meth)acrylamide and (meth)acryldimethylamide.

As other radical polymerizable compound (C2) which can be used jointly with (meth)acrylic acid or its derivative, etc., examples of monoolefin dicarboxylic acids or acid anhydrides thereof and monoalkyl esters of a monoolefin dicarboxylic acid include maleic acid, chloromaleic acid, citraconic acid, itaconic acid, gluconic acid, and acid anhydrides thereof, and monoesters of such an acid and a lower alkyl such as methyl and ethyl. Besides, there are enumerated urethane-modified polyhydric acrylates having a (meth) acryloyl group in one molecule thereof, vinyl acetate, ethyl vinyl ether, butyl vinyl ether, and hexyl vinyl ether.

In the foregoing method (1) for connecting the side chain containing the (meth)acrylic polymer chain (B) to the principal chain of the acid-modified propylene-based polymer, in the reaction in which after binding the compound (C1) having a radical polymerizable unsaturated bond with the acid-modified propylene-based polymer, the radical polymerizable unsaturated compound (C2) containing at least (meth)acrylic acid and/or its derivative is graft copolymerized, for the purpose of preventing the formation of a homopolymer of the subject radical polymerizable compound (C1) or (C2) in the reaction, it is preferable that the reaction is carried out under an oxygen or air atmosphere and that an adequate amount of a polymerization inhibitor such as hydroquinone, hydroquinone monomethyl ether, and phenothiazine is added in the reaction system.

In the reaction for binding the compound (C1) having a radical polymerizable unsaturated bond with the principal chain of the acid-modified propylene polymer in the method (C1), or for reacting a formed copolymer between the compound (1) having a radical polymerizable unsaturated bond and the radical polymerizable unsaturated compound (C2) containing (meth)acrylic acid and/or its derivative with the principal chain of the acid-modified propylene polymer in the method (2), the reaction temperature is usually from 20 to 180° C., and preferably from 50 to 150° C. During this, as a catalyst for promoting the reaction, acids or basic compounds, for example, p-toluenesulfonic acid, zinc chloride, pyridine, triethylamine, dimethylbenzylamine, tetramethylammonium bromide, 1,8-diazabicyclo]5.4.0]-7-undecene (DBU), and 4-dimethylaminopyridine (DMAP) may be used in the esterification reaction; and dibutylsilver dilaurate, etc. may be used in the urethanation reaction.

The molar ratio of the carboxyl group of the acid-modified propylene-based polymer to the reactive group which the foregoing compound (C1) having a radical polymerizable unsaturated bond or the formed copolymer between the subject compound (C1) and the radical polymerizable unsaturated compound (C2) has, namely an amino group, a hydroxyl group, an epoxy group, or an isocyanate group, is in the range of from 5/1 to 1/5, and preferably in the range of from 2/1 to 1/2.

In the foregoing methods (1) and (2), as the method for copolymerizing the radical polymerizable unsaturated compound (C2) with the compound (C1) having a group capable of reacting with the carboxyl group or dicarboxylic acid anhydride group and a radical polymerizable unsaturated bond, or the method for graft polymerizing the subject (C2) on the modified propylene-based polymer having (C1) bound therewith, there are enumerated known methods similar to a method in which the foregoing carboxyl group-containing radical polymerizable unsaturated compound is subjected to graft copolymerization, namely radical polymerization on the propylene-based polymer to form an acid-modified propylene-based polymer.

With respect to the reaction conditions as used in the methods (1) and (2) including the radical polymerization initiator, reaction temperature and reaction time, those as described in the foregoing method for graft copolymerizing the carboxyl group-containing radical polymerizable unsaturated compound on the propylene-based polymer can be properly employed. In this case, the use proportion of the radical polymerization initiator to the sum of the radical polymerizable unsaturated compounds (C1) and (C2) is usually in the range of from 1/500 to 1/10, and preferably from 1/200 to 1/20 in terms of a molar ratio.

Furthermore, for the purpose of preventing gelation at the time of copolymerization from occurring, a chain transfer agents such as alcohols may be used.

In the foregoing methods (1) and (2), in the case where the graft copolymerization reaction, etc. is carried out by using an organic solvent, specific examples of the organic solvent include aromatic hydrocarbons such as benzene, toluene, and xylene; aliphatic hydrocarbons such as n-hexane and n-heptane; alicyclic aliphatic hydrocarbons such as cyclohexane and methylcyclohexane; halogenated hydrocarbons such as perchloroethylene, chlorobenzene, and o-dichlorobenzene; carboxylic acid esters such as methyl acetate and ethyl acetate; and alcohols such as ethanol and isopropanol. They can be used singly or as a mixed solvent.

In the invention, the polypropylene copolymer as obtained in the foregoing methods has a polymer principal chain (A) comprising an acid-modified propylene-based polymer and a side chain containing at least a (meth)acrylic polymer chain (B). Here, at least the (meth)acrylic polymer chain (B) is connected to a side chain as bound via a reactive group such as a carboxyl group in the polymer principal chain (A) comprising an acid-modified polypropylene-based polymer. In the polypropylene copolymer, a ratio of (A)/(B) which is a ratio of the polymer principal chain (A) comprising an acid-modified polypropylene-based polymer to the (meth)acrylic polymer chain (B) is in the range of from 20/1 to 1/20, preferably 10/1 to 1/10, more preferably from 4/1 to 1/4, and especially preferably from 3/1 to 1/3 in terms of a weight ratio.

The "weight of the (meth)acrylic-polymer chain (B)" as referred to herein shows the weight as occupied by the (meth)acrylic monomer (C2) in the (meth)acrylic polymer chain. In the case where the weight ratio of (A)/(B) exceeds the range of from 20/1 to 1/20, i.e., (A) is too large while (B) is too small, compatibility with a polar resin is low so that separation is caused. On the other hand, in the case where (A) is too small while (B) is too large, adhesion to a crystalline polypropylene-based resin becomes poor, and therefore, such is not preferable. The "polar resin" as referred to herein is one as used in general-purpose paints, primers, inks, etc., and examples thereof include poly(meth) acrylate resins, polyester resins, polyether resins, polycarbonate resins, polyurethane resins, melamine resins, and alkyd resins.

In the invention, in the case of applications in which importance is attached to non-tackiness, such as direct coating and interior application, the (meth)acrylic polymer chain (B) has a Tg preferably in the range of from 30 to 100° C., and more preferably from 50 to 90° C. When the Tg exceeds 100° C., the hardness increases so that cracking possibly occurs, while when it is lower than 30° C., sticking is often observed. In the case where importance is attached to adhesion rather than non-tackiness, such as primer application, the Tg is preferably in the range of from −50 to 30° C., and more preferably from −20 to 10° C. When the Tg exceeds 30° C., adhesion is possibly lowered, while it is lower than −50° C., a cohesive power is lowered so that adhesion is possibly lowered.

In the invention, the polypropylene copolymer having a polymer principal chain (A) comprising a modified propylene polymer and a side chain containing a polymer chain (B) in which a repeating unit thereof is formed by ester bond is a polypropylene copolymer having a side chain containing a polyester-based polymer chain. This polypropylene copolymer containing a polyester-based polymer chain in the side chain thereof refers to a polymer having a reactive group-containing propylene-based polymer and a polyester or a polyester polyol bound therein, and preferably a polypropylene copolymer in which an acid-modified propylene-based polymer having a carboxyl group, etc. and a polyester polyol are subjected to dehydration condensation to introduce a polyester side chain.

The polyester or polyester polyol which is used in the invention can be obtained by polycondensation of the following polyhydric alcohol and a polybasic acid by a known method or ring opening polymerization of an aliphatic lactone.

As the polyhydric alcohol, one or more kinds of aliphatic polyhydric alcohols such as ethylene glycol, diethylene glycol, polyethylene glycol, propylene glycol, dipropylene glycol, polypropylene glycol, neopentyl glycol, 1,2-, 1,3-, 1,4- or 2,3-butanediol, 1,5-pentanediol, 3-methyl-1,5-pentanediol, and 1,6-hexanediol can be combined and used.

Furthermore, as the polybasic acid, one or more kinds of polybasic acids such as aliphatic or aromatic dicarboxylic acids, for example, maleic acid, fumaric acid, succinic acid, itaconic acid, adipic acid, azelaic acid, sebacic acid, phthalic acid, isophthalic acid, terephthalic acid, tetrahydrophthalic acid, hexahydrophthalic acid, methyltetrahydrophthalic acid, and acid anhydrides thereof; and aromatic polyhydric carboxylic acids such as trimellitic acid, pyromellitic acid, and acid anhydrides thereof can be combined and used.

Moreover, as the aliphatic lactone, one or more kinds of saturated aliphatic lactones such as γ-caprolactone, δ-caprolactone, ε-caprolactone, γ-valerolactone, δ-valerolactone, ε-valerolactone, and β-methyl-δ-valerolactone can be combined and used.

The polyester polyol suitably has a hydroxyl group value of from 30 to 250 KOH-mg/g. When the hydroxyl group value exceeds 250 KOH-mg/g, water resistance of the resulting polymer is lowered, and therefore, such is not preferable.

As the polyester polyol, polyester polyols having an average molecular weight of from 300, to 100,000 can be used. A ratio of (A)/(B) which is a ratio of the polymer principal chain (A) comprising an acid-modified polypropylene-based polymer to the polyester-based polymer chain (B) is in the range of from 20/1 to 1/20, preferably 10/1 to 1/10, more preferably from 4/1 to 1/4, and especially preferably from 3/1 to 1/3 in terms of a weight ratio.

In the case where the weight ratio of (A)/(B) exceeds the range of from 20/1 to 1/20, i.e., (A) is too large while (B) is too small, compatibility with a polar resin is low so that separation is caused. On the other hand, in the case where (A) is too small while (B) is too large, adhesion to a crystalline polypropylene-based resin becomes poor, and therefore, such is not preferable.

The polyester polyol can be introduced by esterification or an ester exchange reaction with the carboxyl group or dicarboxylic acid anhydride group which the acid-modified propylene-based polymer has. As the introduction method, any of a method for melting by heating at the melting point or higher to achieve the reaction (melting method) or a method for dissolution in an organic solvent such as toluene and xylene to achieve the reaction (solution method) may be employed. However, the solution method is preferable while taking into consideration the point that the reaction can be uniformly carried out.

In the case of carrying out the introduction by the melt method, it is possible to achieve the introduction by using a device such as a Banbury mixer, a kneader, and an extruder. In general, it is desired to carry out the reaction at the melting point of the polymer or higher, and the reaction time is suitably from 10 minutes to 3 hours.

In the case of carrying out the introduction by the solution method, the reaction temperature is in the range of from 20 to 160° C., and the reaction time is suitably from 1 to 5 hours. As the solvent, it is possible to use a solvent the same as that at the time of binding the (meth)acrylate polymer chain.

As the catalyst for promoting the esterification reaction, it is possible to similarly use a catalyst compound as enumerated as the catalyst which can be used at the time of binding the compound (C1) having a group capable of reacting with the carboxyl group or dicarboxylic acid anhydride group of the acid-modified propylene-based polymer and a radical polymerizable unsaturated bond in the molecule thereof or the (meth)acrylate-based polymer chain (B) with the principal chain of the acid-modified polypropylene-based polymer.

In the invention, the polypropylene copolymer having a polymer principal chain (A) which is derived from a modified propylene-based polymer and a side chain containing a polymer chain (B) in which a repeating unit thereof is formed by ether bond is a polypropylene copolymer having a side chain containing a polyether-based polymer chain. This polypropylene copolymer containing a polyether-based polymer chain in the side chain thereof refers to a polymer having a reactive group-containing modified propylene-based polymer and a polyether polyol bound therein, and preferably a polypropylene copolymer in which an acid-modified propylene-based polymer having a carboxyl group, etc. and a polyether polyol are subjected to dehydration condensation to introduce a polyether side chain.

The polyether polyol which is used in the invention can be obtained by, for example, subjecting the following cyclic alkylene oxide to ring opening polymerization by a known method.

Examples of the cyclic alkylene oxide include ethylene oxide, propylene oxide, trimethylene oxide, and tetrahydrofuran.

Examples of the polyether polyol include ones obtained by ring opening polymerization of the foregoing cyclic alkylene oxide, such as polyethylene glycol, polypropylene glycol, and polytetramethylene glycol. The polyether polyol suitably has a hydroxyl group value of from 30 to 250 KOH-mg/g. When the hydroxyl group value exceeds 250 KOH-mg/g, water resistance of the resulting polymer is lowered, and therefore, such is not preferable.

As the polyether polyol, polyether polyols having an average molecular weight of from 300 to 100,000 can be used.

A ratio of (A)/(B) which is a ratio of the polymer principal chain (A) comprising an acid-modified polypropylene-based polymer to the polyether-based polymer chain (B) is in the range of from 20/1 to 1/20, preferably 10/1 to 1/10, more preferably from 4/1 to 1/4, and especially preferably from 3/1 to 1/3 in terms of a weight ratio. In the case where the weight ratio of (A)/(B) exceeds the range of from 20/1 to 1/20, i.e., (A) is too large while (B) is too small, compatibility with a polar resin is low so that separation is caused. On the other hand, in the case where (A) is too small while (B) is too large, adhesion to a crystalline polypropylene-based resin becomes poor, and therefore, such is not preferable.

With respect to a method for introducing the polyether polyol into the principal chain of the acid-modified polypropylene-based polymer, a reaction method, a reaction condition and a reaction catalyst the same as in the foregoing introduction method of a polyester polyol can be properly employed.

In the case of a functional group-containing propylene-based polymer other than the foregoing acid-modified propylene-based polymer, depending upon the kind of a functional group, by using a compound (C1) having a group capable of reacting with the subject functional group and a radical polymerizable unsaturated bond in the molecule thereof and carrying out the reaction in the same manner, it is possible to connect a polymer side chain (B) to the principal chain.

The polypropylene copolymer of the invention is not only excellent in compatibility with a polar resin but also extremely good in solubility in a variety of solvents and has the following characteristics (a) to (c).

(a) When dissolved in toluene at 25° C. together with an acrylic resin in a weight ratio of 50/50 and in a concentration of solids of 12% by weight, transmittance (at 650 nm) is 80% or more.

(b) When dissolved in toluene at 25° C. in a concentration of 10% by weight, the content of an insoluble matter is not more than 1% by weight based on the whole of polymers.

(c) Adhesion by an adhesion test (cross-cut tape test) to a polypropylene substrate is 50/100 or more.

The polypropylene copolymer of the invention is excellent in compatibility with a polar resin such as acrylic resins. Its characteristic is such that (a) when dissolved in toluene at 25° C. together with an acrylic resin in a weight ratio of 50/50 and in a concentration of solids of 12% by weight, its transmittance (at 650 nm) is 80% or more, preferably 85% or more, and more preferably 90% or more.

Here, "HITALOID 3904" as manufactured by Hitachi Chemical Co., Ltd. was used as the acrylic resin. However, resins having a viscosity in the range of from 3,000 to 4,000 mPa·s, preferably from 3,200 to 3,600 mPa·s, and more preferably from 3,300 to 3,500 mPa·s (concentration: 50 wt %, xylene: 40 wt %, butyl acetate: 10 wt %, temperature: 25° C.) and a solubility parameter of from 10.1 to 10.5 $(cal/cm^3)^{1/2}$ and preferably from 10.2 to 10.4 $(cal/cm^3)^{1/2}$ (see Fedors, *Polym. Eng. Sci.*, 14(2), 147 (1974)) equivalent to "HITALOID 3904" can be used as the acrylic resin.

As a method for measuring the compatibility, there is employed a method in which a solution containing the copolymer of the invention and the polar resin whose concentration has been adjusted at the foregoing concentration is charged in a quartz cell having a width of 10 mm, and its transmittance is measured by light having a prescribed wavelength.

Furthermore, solubility of the polypropylene copolymer of the invention is very excellent as compared with usual highly stereospecific isotactic polypropylene modified materials. Its solubility is such that (b) when dissolved in toluene at 25° C. in a concentration of 10% by weight, the content of an insoluble matter is not more than 1% by weight, and preferably not more than 0.1% by weight based on the whole of polymers, and it is preferable that no insoluble matter is contained.

As a method for measuring the solubility, for example, there is employed a method in which a solution having been dissolved at a prescribed temperature and in a prescribed concentration is filtered at a temperature in the vicinity of that temperature (in the case of a high temperature, filtration under heating), a filter paper or SUS-made wire net (the weight is previously measured) as used at that time is dried, and the weight of an insoluble matter is measured.

In addition, the propylene copolymer of the invention is excellent in adhesion to a polypropylene molded article, and its adhesion is such that (c) adhesion by an adhesion test (cross-cut tape test) to a polypropylene substrate is 50/100 or more, preferably 80/100 or more, and more preferably 100/100.

Incidentally, the adhesion of the propylene copolymer in the invention is one according to the following adhesion test method.

Adhesion Test (A) The adhesion test is carried out according to a cross-cut tape test as described in JIS K5400 8.5.2.

(1) Gist:

A cut penetrating into a coating film of a specimen and reaching the base surface is provided in a cross-cut form, an adhesive tape is applied on the cross-cuts, and after peeling away the adhesive tape, the adhesion state of the coating film is visually observed.

(2) Device and Material:

(a) Cutter knife: One according to JIS K5400 7.2(2) (e)

(b) Cutter guide: One according to JIS K5400 8.5.1(2) (b)

(c) Cellophane adhesive tape: A cellophane adhesive tape as defined in JIS Z1522 and having a width of 18 mm or 24 mm and an adhesive strength of 2.94 N/10 mm or more (d) Test plate: A polypropylene molded article (150 mm×70 mm×3 mm)

(e) Eraser: One as defined in JIS S6050

(3) Preparation of Specimen:

A sample prepared by coating one surface of a specimen by a method as defined in the product standards of sample according to JIS K5400 3.3, drying and then standing for 24 hours in the standard state is used.

(4) Operation:

According to JIS K5400 8.5.2(4)

(5) Evaluation:

The evaluation is carried out as follows.

(a) The cut state in the cross-cut form as provided on the coated surface of the specimen is observed, the number of cross-cuts which have not been peeled away among 100 cross-cuts is counted, and the adhesion is expressed in terms of "number of residual cross-cuts/100".

As the polypropylene substrate which is used in the adhesion test of the invention, crystalline polypropylene is used. As the crystalline polypropylene, there are enumerated a propylene homopolymer and/or a propylene-ethylene block copolymer comprising a propylene homopolymer segment and a propylene-ethylene copolymer segment. Above all, it is preferred to use a propylene homopolymer having an MFR (at 230° C. under a load of 21.18 N) of from 5 to 30 (g/10 min).

As described previously, since the polypropylene copolymer of the invention is excellent in compatibility with a polar resin such as acrylic resins and has good solubility in a solvent, it can be dissolved in a variety of solvents. Specific examples of the solvent include aromatic hydrocarbons such as benzene, toluene, and xylene; aliphatic hydrocarbons such as n-pentane, n-hexane, n-heptane, n-octane, and n-decane; alicyclic aliphatic hydrocarbons such as cyclohexane, methylcyclohexane, ethylcyclohexane, dimethylcyclohexane, and decalin; halogenated hydrocarbons such as methylene chloride, carbon tetrachloride, trichloroethylene, perchloroethylene, chlorobenzene, and o-dichlorobenzene; esters such as n-ethyl acetate and n-butyl acetate; ketones such as methyl isobutyl ketone and cyclohexanone; and polar solvents such as tetrahydrofuran and dimethyl sulfoxide. Of these, aromatic hydrocarbons and alicyclic hydrocarbons are preferable; and toluene, xylene, methylcyclohexane, and ethylcyclohexane are especially preferable.

As described previously, since the polypropylene copolymer of the invention is soluble in a variety of solvents, it is possible to coat a coating composition having the subject polypropylene copolymer dissolved in a solvent on a molded article (substrate) of a crystalline olefin-based polymer, thereby forming a coating film. Moreover, the coating film is excellent in adhesion to the substrate and can be used as an adhesive. Examples of the olefin-based polymer as the substrate include olefin-based polymers such as high pressure process polyethylene, polyethylene from medium or low pressure polymerization process, polypropylene, poly-4-methyl-1-pentene, poly-1-butene, and polystyrene; and olefin-based copolymers such as an ethylene.propylene copolymer, an ethylene.butene copolymer, and a propylene.butene copolymer. Of these olefin-based copolymers, propylene-based copolymers are preferably used. Furthermore, the polypropylene copolymer of the invention can be used for surface treatment in molded articles made of polypropylene and a synthetic rubber, molded articles made of a polyamide resin, an unsaturated polyester resin, a polybutylene terephthalate resin, a polycarbonate resin, etc., molded articles, for example, automobile bumpers, and steel plates or steel plates for electrodeposition treatment, and the like. Moreover, when the polypropylene copolymer of the invention is undercoated on the surface having been coated with a paint, a primer, an adhesive, etc. containing, as the major component, a polyurethane resin, a fatty acid-modified polyester resin, an oil-free polyester resin, a melamine resin, an epoxy resin, a polycarbonate resin, a polyamide resin, a phenol resin, an alkyd resin, a polyether resin, an acrylic resin, etc., it can be used for forming a coating film having improved adhesion of the paint, etc. to that surface and having excellent distinctness of image and low-temperature impact resistance, etc.

Also, it is possible to use a blend of the resin of the invention with an unmodified polypropylene resin, a polymer of a conjugated diene such as butadiene and isoprene or a hydrogenated material thereof, a chlorinated polyolefin such as chlorinated polyethylene, chlorinated polypropylene, and chlorinated polyethylenepropylene, a chlorosulfonated polyolefin, an ethylene.vinyl acetate copolymer or a chlorinated material or chlorosulfonated material thereof, etc. as the need arises.

In addition, in preparing a coating composition containing the polypropylene copolymer of the invention, in the case where a reactive group such as a hydroxyl group, an epoxy group, an amino group, a carboxyl group, and an isocyanate group is present in the polymer principal chain (A) derived from a propylene-based polymer or the polymer chain (B), by using a hydroxy group-, epoxy group-, amino group-, carboxyl group- or isocyanate group-containing compound capable of causing crosslinking reaction with such a reactive group at the time of molding a coating film, it is also possible to enhance coating film performance.

The polypropylene copolymer of the invention can also be used as an aqueous dispersion. The aqueous dispersion of the invention contains a polypropylene copolymer and a surfactant in an aqueous medium and further contains a variety of additives which are added as need arises.

As the surfactant, though all of nonionic surfactants, anionic surfactants, cationic surfactants, and ampholytic surfactants can be used, nonionic surfactants are preferable. Examples of nonionic surfactants include polyoxyethylene alkyl ethers, polyoxyethylene alkylphenyl ethers, polyoxyethylene fatty acid esters, polyoxyethylene sorbitan fatty acid esters, polyoxyethylene sorbitol fatty acid esters, polyoxyethylene polyoxypropylene block polymers, sorbitan fatty acid esters, polyoxyalkylene alkyl ethers, glycerin fatty acid esters, polyoxyethylene alkylamines, and alkyl alkanolamides. Examples of anionic surfactants include fatty acid salts, alkylsulfuric acid ester salts, polyoxyethylene alkyl ether sulfuric acid ester salts, sodium alkylbenzenesulfonates, sodium alkylnaphthalenesulfonates, alkylsulfosuccinic acid salts, alkyl diphenyl ether disulfonic acid salts, alkyl phosphoric acid salts, and naphthalene sulfonic acid formalin condensates. These surfactants can be used singly or in admixture of two or more kinds thereof. The surfactant is used usually in a proportion of from 1 to 100 parts by weight, and preferably from 3 to 50 parts by weight based on 100 parts by weight of the polypropylene copolymer.

For the purpose of increasing dispersion stability of the polypropylene copolymer, it is preferable that a basic substance is present in the aqueous dispersion of the invention. Examples of the basic substance include inorganic bases such as sodium hydroxide, potassium hydroxide, and sodium carbonate; ammonia; and amines such as methylamine, dimethylamine, trimethylamine, ethanolamine, diethanolamine, triethanolamine, and 2-ethyl-2-aminopropanol. Of these, amines are preferable. The basic substance is used in a proportion of from 0.01 to 10 parts by weight, and preferably from 0.1 to 5 parts by weight based on 100 parts by weight of the polypropylene copolymer.

In the aqueous dispersion of the polypropylene copolymer of the invention, when it is used for applications such as a primer and a paint, for the purpose of increasing the drying speed or obtaining a surface with good finish feeling, it is possible to blend a hydrophilic organic solvent other than water. Examples of the hydrophilic organic solvent include alcohols such as methanol and ethanol; ketones such as acetone and methyl ethyl ketone; and glycols such as ethylene glycol and propylene glycols and ethers thereof.

In addition, if desired, it is possible to use a blend of the aqueous dispersion of the invention with other aqueous resin such as aqueous acrylic resins, aqueous urethane resins, aqueous epoxy resins, aqueous alkyd resins, aqueous phenol resins, aqueous amino resins, aqueous polybutadiene resins, and aqueous silicone resins.

Since the coating film which is formed during coating the coating composition or aqueous dispersion of the invention exhibits good adhesion to an olefin-based polymer as the substrate, the polypropylene copolymer of the invention can be used as an adhesive resin to the subject olefin-based polymer. Incidentally, in order to obtain good adhesion to the substrate of the olefin-based polymer, it is preferable that heating is carried out after coating. While the heating temperature is not particularly limited, it is preferably from 50 to 150° C., and more preferably from 60 to 130° C. while taking into consideration practical use. A method for coating the coating composition is not particularly limited, and conventionally known methods such as a coating method by spraying, a coating method using a roll, and a coating method using a brush can be employed.

As a method for applying the aqueous dispersion of the invention on the surface of the foregoing molded article (substrate), spray coating is suitable, and for example, the aqueous dispersion is sprayed on the surface of the molded article by using a spray gun. Coating on the molded article may be carried out at an ordinary temperature, and after coating, it is possible to form a dried coating film by an adequate method such as spontaneous drying and thermally forced drying.

It is possible to coat a paint on the surface of a molded article on which the coating composition or aqueous dispersion of the invention has been coated to form a coating film, by a method such as electrostatic coating, blow coating, and brush coating.

The paint may be applied as a single layer coating film or a multilayered coating film by wet-on-wet coating. After coating the paint, the coating film is cured by a usual heating method by a nichrome wire, infrared light, high frequency, etc., whereby a molded article having a desired coating film on the surface thereof can be obtained. A method for curing the coating film is properly chosen depending upon the material quality and shape of the molded article, properties of the paint to be used, and the like.

By coating the coating composition or aqueous dispersion of the invention on the surface of a molded article made of an α-olefin copolymer as the major component or other copolymer, it is possible to use the coating composition or aqueous dispersion of the invention as a primer, etc. for improving adhesion of the paint onto that surface and coating film performance such as water resistance and gasoline resistance. It is also possible to apply the coating composition or aqueous dispersion of the invention to a wide range of utilities other than the foregoing utility as a primer of the molded article while making the most of excellent characteristic features in adhesion, peeling strength and water resistance. For example, the coating composition or aqueous dispersion of the invention can be applied to utilities such as an additive for adhesives or paints and a compatibilizing agent between a polyolefin and a polar resin.

In addition to the foregoing materials, if desired, the coating composition or aqueous dispersion of the invention may be blended with a variety of stabilizers such as antioxidants, weathering stabilizers, and heat resistant preventives; coloring agents such as titanium oxide and organic pigments; and a variety of additives such as conductivity imparting agents such as carbon black and ferrite, antiseptics, fungicides, and rust preventives and provided for use. Additionally, a tackifier and a defoaming agent may be added in the aqueous dispersion, and for the purpose of improving wettability with the substrate to be coated, a small amount of an organic solvent may be added, if desired.

Furthermore, a molded article to which the composition of the invention is applied may be one prepared by molding the foregoing every kind of polymer or resin by any of known methods such as injecting molding, compression molding, blow molding, extrusion molding, and rotational molding.

Even in the case where in a molded article to which the coating composition or aqueous dispersion of the invention is applied, an inorganic filler or a pigment such as talc, zinc flower, glass fiber, titanium white, and magnesium sulfate or the like is blended, it is possible to form a coating film especially having good adhesion.

Moreover, a molded article on which the coating composition or aqueous dispersion of the invention is coated may contain various stabilizers and ultraviolet absorbers and the like in addition to the foregoing materials.

Examples of the stabilizer which is preferably used include phenol-based stabilizers such as 2,6-di-t-butyl-4-methylphenol, tetrakis[methylene(3,5-di-4-hydroxyhydrocinnamato)]methane, m-octadecyl-3-(4'-hydroxy-3,5-di-t-butyl-phenyl)propionate, 2,2'-methylenebis(4-methyl-6-t-butyl-phenol), 4,4'-butylidenebis(3-methyl-6-t-butylphenol), 2,2-thiobis(4-methyl-6-t-butylphenol), 1,3,5-trimethyl-2,4,6-tris(3,5-di-t-butyl-4-hydroxybenzyl) benzene, and 1,3,5-tris(2-methyl-4-hydroxy-5-t-butyl-phenol)butane; sulfur-based stabilizers such as dilaurylthio dipropionate and distearylthio dipropionate; and phosphorus-based stabilizers such as tridecyl phosphite and trinonylphenyl phosphite.

Furthermore, examples of the ultraviolet absorber which is used include 2-hydroxy-4-octoxybenzophenone, 2-ethylhexyl-2-cyano-3,3-diphenyl acrylate, and p-octylphenyl salicylate.

EXAMPLES

The invention will be more specifically described below with reference to the following Production Examples and Examples and the like, but it should be construed that the invention is never limited to these Examples.

Incidentally, in the following Production Examples and the like, a catalyst synthesis step and a polymerization step were all carried out in a purified nitrogen atmosphere; and a solvent was used after dehydrating by a molecular sieve (MS-4A) and then bubbling with purified nitrogen to achieve deaerating.

Furthermore, in the following Production Examples and the like, physical properties of a propylene-based polymer and the like were measured in the following manners.

<Measurement of Physical Properties of Propylene-based Polymer>

(1) A weight average molecular weight Mw, a number average molecular weight Mn, and a molecular weight distribution Mw/Mn were measured by using GPC (150CV Model, manufactured by Waters). o-Dichlorobenzene was used as a solvent, and the measurement temperature was set up at 135° C.

(2) Pentads $S_1/S$ and block index $(4+2S_1/S)$ of a propylene unit sequence segment were measured by the foregoing $^{13}$C-NMR spectral measurement method.

(3) A melting point [Tm] and a crystal melting heat were determined using a Du Pont's thermal analysis system TA2000 by the following method.

A sample (about 5 to 10 mg) was melted at 200° C. for 3 minutes; the temperature was dropped to 30° C. at a rate of 10° C./min and then elevated to 200° C. at 10° C./min, thereby obtaining a melting curve; and a peak top temperature of a main heat absorption peak in the final temperature elevation stage was determined as a melting point.

(4)-1 As a quantitative determination method of an ethylene component [E], the ethylene content (molar fraction) was determined as an average value of values as calculated by two kinds of methods of (1) a method for calculation from only α-methylene and (2) a method for calculation from only β-methylene, while utilizing the foregoing $^{13}$C-NMR spectral measurement.

---

(1) α-Methylene method:

$[CH]_\alpha$: $T_A + (T_C + T_D)/2$
$[CH_2]_\alpha$: $T_A + 2T_C + T_D + T_{F3-5} - T_I$
$[C2]_\alpha$: $([CH_2]_\alpha - [CH]_\alpha)/([CH_2]_\alpha + [CH]_\alpha)$ (2) β-Methylene method:

$[CH]_\beta$: $T_A + (T_H + 2T_I T_D)/2$
$[CH_2]_\beta$: $T_A + T_D + T_{F3-5} + 2T_H + 3T_I$
$[C2]_\beta$: $([CH_2]_\beta - [CH]_\beta)/([CH_2]_\beta + [CH]_\beta)$
Ethylene content = $([C2]_\alpha + [C2]_\beta)/2$ $T_A = \Sigma I(45.1 - 48.8)$
$T_C = \Sigma I(37.2 - 39.2)$
$T_D = \Sigma I(34.8 - 36.2)$
$T_{F3-5} = \Sigma I(29.5 - 30.9)$
$T_H = \Sigma I(26.9 - 28.0)$
$T_I = \Sigma I(24.3 - 25.5)$

---

(4)-2 As a quantitative determination method of a 1-hexene component, the 1-hexene component can be calculated by calculating the monomer content by the following method while utilizing the foregoing $^{13}$C-NMR spectral measurement and combining with pentads $S_1/S$ and block index $(4+2S_1/S)$ of a propylene unit sequence segment. Furthermore, olefin monomers having 4 or more carbon atoms such as 1-butene, 1-pentene, and 1-octene can be measured in the same manner.

Propylene content=$([PP]+\frac{1}{2}[PH])/([HH]+[PH]+[PP])$

1-Hexene content=$([HH]+\frac{1}{2}[PH])/([HH]+[PH]+[PP])$

[PP] stands for a sequence segment diad of propylene-propylene, and its value is determined from a skeleton $CH_2$ ($S\alpha\alpha$) of a chemical shift of δ48.0 to 45.5 ppm; [PH] stands for a sequence segment diad of propylene-hexene, and its value is determined from a skeleton $CH_2$ ($S\alpha\alpha$) of a chemical shift of δ45.0 to 43.5 ppm; and [HH] stands for a sequence segment diad of hexene-hexene, and its value is determined from a skeleton $CH_2$ ($S\alpha\alpha$) of a chemical shift of δ43.0 to 41.0 ppm. For the measurement method, the following documents can be made hereof by reference.

Soga K., Uozumi T., Park, J. R., *Makromol. Chem.*, 1990, 191, 2853-2864

Soga K., Lee D. H., Shiono T., Kashiwa, N., *Makromol. Chem.*, 1989, 190, 2683

(4)-3 As a quantitative determination method of a functional group-containing monomer component such as (meth) acrylic acid and maleic anhydride, the monomer component can be calculated by calculating the monomer content by IR or other titration method and combining with pentads $S_1/S$ and block index $(4+2S_1/S)$ of a propylene unit sequence segment.

<Production of Propylene Polymer>

Production Example 1

(1) Synthesis of dichloro[dimethylsilylene(cyclopentadienyl)(2,4-dimethyl-4H-1-azulenyl)]hafnium (1)-1 Synthesis of Ligand 2-Methylazulene (4.01 g) was dissolved in tetrahydrofuran (56 mL), and after cooling at 0° C. on an ice bath, methyllithium (a diethyl ether solution (1.14 moles/L), 24.8 mL) was added dropwise at that temperature. After completion of the dropwise addition, the ice bath was removed, and the mixture was stirred for 2 hours. This solution was gradually added dropwise in a tetrahydrofuran solution (140 mL) of dimethylsilyl dichloride (34.0 mL, 0.280 moles) as cooled at 0° C. on an ice bath. After completion of the dropwise addition, the ice bath was removed, the mixture was stirred for 3 hours, and the solvent and unreacted dimethylsilyl dichloride were distilled off in vacuo. Tetrahydrofuran (80 mL) was added, and the mixture was cooled to 0° C., to which was then gradually added dropwise cyclopentadienyl sodium (2.1 moles/L, 26.9 mL, 56.5 mmoles). After completion of the dropwise addition, the mixture was stirred at room temperature for 12 hours. After completion of stirring, water was added, and the desired compound was extracted with diethyl ether. The extract was dehydrated over magnesium sulfate and evaporated to dryness to obtain an unpurified product of the desired ligand. The subject unpurified product was purified by silica gel column chromatography using n-hexane as an elution solvent, thereby obtaining the desired ligand (6.29 g) in a yield of 79%.

(1)-2 Synthesis of Complex

The ligand (6.29 g) as obtained in (1)-1 was dissolved in tetrahydrofuran (100 mL) and cooled at 0° C. on an ice bath. An n-hexane solution of n-butyllithium (1.56 moles/L, 28.4 mL) was gradually added dropwise thereto at that temperature. After completion of the dropwise addition, the ice bath was removed, the mixture was stirred for 3 hours, and the solvent was distilled off in vacuo. After the distillation, toluene (60 mL) was added to the resulting residue, and the mixture was then cooled to −78° C. A toluene (140 mL) suspension of hafnium tetrachloride (7.17 g) as cooled at −78° C. was gradually added thereto. Thereafter, the cooling bath was removed, and the mixture was stirred overnight. After completion of stirring, the reaction mixture was filtered by using a G3 frit. A solid on the frit was further washed with toluene, and the filtrate was concentrated to obtain a brown powder. This brown powder was subjected to extraction with hot n-hexane (180 mL×three times) to obtain the desired complex. The extract was evaporated to dryness, and the resulting solid was subjected to suspension washing with n-hexane (20 mL×five times) and then dried in vacuo, thereby obtaining desired dichloro[dimethylsilylene(cyclopentadienyl)(2,4-dimethyl-4H-1-azulenyl)]hafnium (2.90 g)

(yield: 25%). The results of the $^1$H-NMR measurement of the foregoing compound are shown below.

$^1$H-NMR (CDCl$_3$): δ0.85 (s, 3H), 0.86 (s, 3H), 1.47 (d, J=7.1 Hz, 3H), 2.25 (s, 3H), 3.42 to 3.52 (m, 1H), 5.42 (dd, J=4.7, 10.1 Hz, 1H), 5.80 to 5.85 (m, 2H), 5.90 to 5.95 (m, 1H), 6.16 to 6.20 (m, 2H), 6.65 (d, J=11.4 [[H]] Hz), 6.80 to 6.85 (m, 1H), 6.98 to 7.02 (m, 1H)

(2) Chemical Treatment of Clay Mineral:

In a 1,000-mL round bottom flask, desalted water (110 mL), magnesium sulfate heptahydrate (22.2 g), and sulfuric acid (18.2 g) were collected and dissolved under stirring. Commercially available granulated montmorillonite (BENCLAY SL, manufactured by Mizusawa Industrial Chemicals, Ltd., 16.7 g) was dispersed in this solution, the temperature was elevated to 100° C. over 2 hours, and the dispersion was stirred at 100° C. for 2 hours. Thereafter, the dispersion was cooled to room temperature over one hour, and the resulting slurry was filtered to recover a wet cake. The recovered cake was again slurried with desalted water (500 mL) in a 1,000-mL round bottom flask and then filtered. This operation was repeated twice. The ultimately obtained cake was dried at 110° C. overnight in a nitrogen atmosphere, thereby obtaining chemically treated montmorillonite (13.3 g).

(3) Polymerization:

A toluene solution of triethylaluminum (0.4 mmoles/mL, 4.0 mL) was added to the chemically treated montmorillonite (0.88 g) as obtained in Production Example 1(2), and the mixture was stirred at room temperature for one hour. Toluene (16 mL) was added to this suspension, and after stirring, a supernatant was removed. This operation was repeated twice, and toluene was then added to obtain a clay slurry (slurry concentration=99 mg-clay/mL).

In another flask, triisobutylaluminum (0.15 mmoles) as manufactured by Nippon Aluminum Alkyls, Ltd. was collected, to which were then added the clay slurry (the whole amount) as obtained herein and a toluene diluted solution of the complex (4.0 mg, 7.5 mmoles) as obtained in Production Example 1(1)-2, and the mixture was stirred at room temperature for 10 minutes to obtain a catalyst slurry.

Next, toluene (2,250 mL), triisobutylaluminum (5.7 mmoles), and liquefied propylene (540 mL) were introduced in an induction stirring type autoclave having an internal volume of 5 liters. The whole amount of the foregoing catalyst slurry was introduced at room temperature, the temperature was elevated to 60° C., and stirring was continued at that temperature for one hour while keeping the entire pressure at the time of polymerization constantly at 0.7 MPa. After completion of stirring, the unreacted propylene was purged, thereby stopping the polymerization. The autoclave was opened, the whole amount of the toluene solution of the polymer was recovered, and the solvent and clay residue were removed. There was thus obtained 69 g of a propylene polymer. The results of analysis of the resulting polymer are summarized and shown in Table 1.

Production Example 2

The same operations as in Production Example 1 were followed, except that 17.8 mg (34.2 mmoles) of the complex, triisobutylaluminum (0.342 mmoles) and the clay slurry (11.4 mL) were used as substances for clay slurry; that toluene (1,100 mL), triisobutylaluminum (0.5 mmoles) and liquefied propylene (264 mL) were used; and that the polymerization was carried out at a temperature of 80° C. under an entire pressure of 0.8 MPa for 1.83 hours. As a result, 245 g of a propylene polymer was obtained. The results of analysis of the resulting polymer are summarized and shown in Table 1.

Production Example 3

(1) Synthesis of racemate of dichloro{1,1'-dimethylsilylenebis[2-ethyl-4-(2-fluoro-4-biphenylyl)-4H-azulenyl]} hafnium:

2-Fluoro-4-bromobiphenyl (6.35 g, 25.3 mmoles) was dissolved in a mixed solvent of diethyl ether (50 mL) and n-hexane (50 mL), to which was then added dropwise an n-pentane solution of t-butyllithium (33 mL, 50.6 mmoles, 1.54 N) at −78° C. The mixture was stirred at −10° C. for 2 hours, 2-ethylazulene (3.55 g, 22.8 mmoles) was added to this solution, and the mixture was stirred at room temperature for 2 hours. n-Hexane (30 mL) was added, and a supernatant was removed by decantation. In addition, this operation was repeated once more. n-Hexane (30 mL) and tetrahydrofuran (40 mL) were added to the resulting yellow precipitate at 0° C. Next, N-methyl imidazole (50 mL) and dimethyl dichlorosilane (1.4 mL, 11.4 mmoles) were added, the temperature was elevated to room temperature, and the mixture was stirred at room temperature for one hour. Thereafter, dilute hydrochloric acid was added, and after liquid separation, the organic phase was dried over magnesium sulfate. The solvent was distilled off in vacuo, thereby obtaining a crude product (8.3 g) of dimethylsilylenebis(2-ethyl-4-(2-fluoro-4-biphenyl)-1,4-dihydroazulene)

Next, the thus obtained crude product was dissolved in diethyl ether (30 mL), to which was then added dropwise an n-hexane solution of n-butyllithium (14.9 mL, 22.8 mmoles, 1.53 N) at −70° C., the temperature was gradually elevated, and the mixture was stirred at room temperature overnight. Moreover, toluene (200 mL) was added, the mixture was cooled to −70° C., to which was then added hafnium tetrachloride (3.6 g, 11.4 mmoles), the temperature was gradually elevated, and the mixture was stirred at room temperature for 4 hours. The greater part of the solvent was distilled off in vacuo from the resulting slurry, diethyl ether (50 mL) was added, and the resulting slurry was filtered. The residue was washed with diethyl ether (5 mL×2), ethanol (15 mL×2) and n-hexane (10 mL×2) to obtain a racemic/meso mixture of dichloro{1,1'-dimethylsilylenebis[2-ethyl-4-(2-fluoro-4-biphenylyl)-4H-azulenyl]}hafnium (4.53 g, yield: 42%). The resulting racemic/meso mixture was analyzed by $^1$H-NMR. As a result, it was noted that the racemic/meso mixture was a mixture of 76.6% of a racemate and 23.4% of a meso body.

The thus obtained racemic/meso mixture (4.5 g) was suspended in dichloromethane (35 mL) and irradiated with light for one hour by using a high pressure mercury vapor lamp (100 W). The solvent was distilled off in vacuo, toluene (25 mL) and dichloromethane (11 mL) were added to the resulting solid, and the mixture was heated at 60° C. to obtain a uniform solution. When the dichloromethane was distilled off in vacuo, a crystal was deposited. The resulting crystal was filtered, washed twice with hexane (5 mL), and then dried in vacuo to obtain a racemate (1.79 g).

(2) Chemical Treatment of Clay Mineral:

In a 500-mL round bottom flask, 55.85 g of desalted water, 32.70 g of sulfuric acid, and 8.01 g of lithium hydroxide were added and stirred. Thereafter, 51.65 g of montmorillonite (MIZUSAWA SMECTITE, manufactured by Mizusawa Industrial Chemicals, Ltd) was added, the temperature was elevated, and the mixture was treated under reflux for 140 minutes. 300 mL of desalted water was added, and after suction filtration, the solid component was dispersed in 600 mL of desalted water and subjected to suction filtration. This operation was repeated once more. A residue obtained by the filtration was dried at 100° C. to obtain acid and metal salt treated montmorillonite.

1.05 g of the thus obtained acid and metal salt treated montmorillonite was collected in a 100-mL round bottom flask and dried by heating at 200° C. for 2 hours in vacuo. 4.0 mL of a toluene solution of triethylaluminum (0.5 mmoles/mL) was added thereto under purified nitrogen, and the mixture was allowed to react at room temperature for 30 minutes. Thereafter, the reaction mixture was washed twice with 30 mL of toluene to obtain a toluene slurry containing chemically treated montmorillonite.

(3) Prepolymerization:

The toluene was taken out from the slurry (containing 914.2 mg of the solid content) as obtained in Production Example 3(2), thereby regulating the amount of residual toluene at 1.0 mL. A toluene solution of triisobutylaluminum (0.5 mmoles/mL, 0.5 mL) was added to this slurry, to which was then further added a toluene solution of the racemate of dichloro{1,1'-dimethylsilylenebis[2-ethyl-4-(2-fluoro-4-biphenylyl)-4H-azulenyl]}hafnium (3.0 mmoles/mL, 9.2 mL) as synthesized in Production Example 3(1), and the mixture was stirred at room temperature for one hour to obtain a catalyst slurry.

40 mL of toluene and the whole amount of the foregoing catalyst slurry were introduced in a 2-liter induction stirring type autoclave under purified nitrogen. 11.0 g of propylene was introduced under stirring, and the mixture was subjected to prepolymerization at 30° C. for 2 hours and then at 50° C. for 0.5 hours. After the prepolymerization, the unreacted propylene was purged, the autoclaved was displaced under pressure twice with purified nitrogen of 0.5 MPa, and the prepolymerization catalyst was then discharged. This contained a polymer in an amount of 9.7 g per gram of the chemically treated montmorillonite component.

(4) Polymerization:

A 2-liter induction stirring type autoclave with a built-in anchor type stirring blade was displaced with purified nitrogen, and 750 g of liquefied propylene was charged at 25° C. A toluene solution of triisobutylaluminum (0.1 mmoles/mL, 5.0 mL) wad charged under pressure at that temperature, and the temperature was then elevated to 70° C. Hydrogen was added such that a hydrogen concentration in the vapor phase became 0.2% by mole, and 30.0 mg of the prepolymerization catalyst as obtained above in (3) was then added to initiate polymerization at 70° C. One hour later, the unreacted propylene was purged, thereby terminating the polymerization. An amount of the resulting propylene-based polymer was 384 g. The results of analysis of the resulting polymer are shown in Table 1.

Production Example 4

In an induction stirring type micro-autoclave having an internal volume of 50 mL, highly stereospecific isotactic polypropylene (31.1 g), heptane (180 mL), and Pd/C (manufactured by Aldrich, 10% by weight Pd/C) (7.87 g) were added, and the system was then closed and displaced with nitrogen. Thereafter, hydrogen of 8.0 MPa was introduced, the temperature was elevated to 275° C., and stirring was continued for 6 hours. After cooling, the hydrogen was purged, thereby stopping the reaction. The autoclave was opened, the whole amount of the heptane solution of the polymer was recovered, and the solvent and Pd/C residue were removed. There was thus obtained 30.6 g of a propylene polymer. The results of analysis of the resulting polymer are shown in Table 1.

Incidentally, physical properties of the used highly stereospecific isotactic polypropylene are as follows.

MFR: 15,000
Tm: 154.9
Mw: 37,000
Mn: 18,000
Mw/Mn: 2.1
[mmmm]: 98.4%, [mmmr]: 0.0%, [rmrm]: 0.1%, [rrrr]: 0.2%

Production Example 13

(1) Chemical Treatment of Clay Mineral:

In a 1,000-mL round bottom flask, desalted water (72 mL), lithium sulfate monohydrate (11 g), and sulfuric acid (17 g) were collected and dissolved under stirring. Commercially available granulated montmorillonite (BENCLAY SL, manufactured by Mizusawa Industrial Chemicals, Ltd., 22 g) was dispersed in this solution, the temperature was elevated to 100° C., and the dispersion was stirred for 5 hours. Thereafter, the dispersion was cooled to room temperature over one hour, and the resulting slurry was filtered to recover a wet cake. The recovered cake was again slurried with desalted water (500 mL) in a 1,000-mL round bottom flask and then filtered. This operation was repeated thrice. The ultimately obtained cake was dried at 200° C. for one hour in vacuo in a nitrogen atmosphere, thereby obtaining chemically treated montmorillonite (15.6 g).

(2) Polymerization:

A toluene solution of triisobutylaluminum (0.5 mmoles/mL, 1.0 mL) was added to the chemically treated montmorillonite (0.25 g) as obtained in Production Example 1(2), and the mixture was stirred at room temperature for 30 minutes. Toluene (8 mL) was added to this suspension, and after stirring, a supernatant was removed. This operation was repeated twice, and toluene was then added to obtain a clay slurry (slurry concentration=99 mg-clay/mL).

In another flask, triisobutylaluminum (0.15 mmoles) as manufactured by Nippon Aluminum Alkyls, Ltd. was collected, to which were then added the clay slurry (the whole amount) as obtained herein and a toluene diluted solution of the complex (4.0 mg, 7.5 mmoles) as obtained in Production Example 1(1)-2, and the mixture was stirred at room temperature for 10 minutes to obtain a catalyst slurry.

Next, toluene (1,100 mL), triisobutylaluminum (0.13 mmoles), liquefied propylene (264 mL), and 1-hexene (0.60 moles, 50 g) were introduced in an induction stirring type autoclave having an internal volume of 2 liters. The whole amount of the foregoing catalyst slurry was introduced at room temperature, the temperature was elevated to 80° C., and stirring was continued at that temperature for one hour while keeping the entire pressure at the time of polymerization constantly at 0.85 MPa. After completion of stirring, the unreacted propylene was purged, thereby stopping the polymerization. The autoclave was opened, the whole amount of the toluene solution of the polymer was recovered, and the solvent and clay residue were removed. There was thus obtained 35 g of a propylene-1-hexene copolymer. The results of analysis of the resulting polymer are summarized and shown in Table 1.

Reference Example 1

Physical properties of UBETAC UT-2115 manufactured by Ube Industries, Ltd. were measured in the same manner. The measurement results are shown in Table 1.

Reference Example 2

Physical properties of TAFMER S4030 manufactured by Mitsui Chemicals, Inc. were measured in the same manner. The measurement results are shown in Table 1.

measurement of physical properties of the resulting modified polymer are shown in Table 2.

Production Example 7

The same operations as in Production Example 5 were followed, except for using toluene (40 g), the propylene polymer (10 g) as obtained in Production Example 1, maleic anhydride (5 g), and PERBUTYL I (manufactured by NOF Corporation) (3 g). The grafting rate and results of the measurement of physical properties of the resulting modified polymer are shown in Table 2.

TABLE 1

Production Examples 1 to 4 and 13, and Reference Examples 1 to 2

| | Item | Unit | Production Example 1 | Production Example 2 | Production Example 3 | Production Example 4 | Reference Example 1 | Reference Example 2 | Production Example 13 |
|---|---|---|---|---|---|---|---|---|---|
| Primary structure | Mw | | 110,000 | 66,000 | 41,000 | 110,000 | 18,000 | 310,000 | 70,000 |
| | Mn | | 31,000 | 20,000 | 19,000 | 53,000 | 4,500 | 57,000 | 22,000 |
| | Mw/Mn | | 3.6 | 3.2 | 2.2 | 2.1 | 5.8 | 5.5 | 3.2 |
| | $S_1/S$ | (%) | 41.1 | 35 | 10.7 | >99.9 | 43.9 | 13 | 35.7 |
| | $4 + 2S_1/S_2$ | | 9.0 | 8.3 | 5.7 | >1000 | 11.3 | 6.4 | 7.2 |
| | [Tm] | (° C.) | Detection was impossible. | Detection was impossible. | Detection was impossible. | 156 | 143 | 115.9 | Detection was impossible. |
| | Copolymerization component | (% by mole) | 0 | 0 | 0 | 0 | 0 | *1 18 | *2 5.8 |

*1: Ethylene component
*2: 1-Hexene component

<Production of Acid-modified Propylene Polymer>

Production Example 5

In a glass flask equipped with a reflux condenser, a dropping funnel, a thermometer and a stirrer, toluene (160 g), the propylene polymer (40 g) as obtained in Production Example 1, and maleic anhydride (6 g) were added, the inside of the vessel was displaced with a nitrogen gas, and the temperature was then elevated to 110° C. After the temperature elevation, a toluene solution of PERBUTYL I (t-butyl peroxyisopropyl monocarbonate, manufactured by NOF Corporation) (2.8 g) was fed over 2 hours by using a metering pump, and stirring was then continued at that temperature for 3 hours, thereby achieving reaction. After completion of the reaction, the system was cooled to the vicinity of room temperature, acetone was added, and a precipitated polymer was separated by filtration. Moreover, precipitation with acetone and separation by filtration were repeated, and an ultimately obtained polymer was washed with acetone. After washing, the resulting polymer was dried in vacuo to obtain a modified polymer in a white powder form. This modified polymer was subjected to infrared absorption spectral measurement and neutralization titration, etc. As a result, the content (grafting rate) of a maleic anhydride group was 1.5% by weight. The grafting rate and results of the measurement of physical properties of the resulting modified polymer are shown in Table 2.

Production Example 6

The same operations as in Production Example 5 were followed, except for using toluene (40 g), the propylene polymer (10 g) as obtained in Production Example 1, maleic anhydride (2.4 g), and PERBUTYL I (manufactured by NOF Corporation) (1 g). The grafting rate and results of the

Production Example 8

The same operations as in Production Example 5 were followed, except for using the propylene polymer as synthesized in Production Example 2. The grafting rate and results of the measurement of physical properties of the resulting modified polymer are shown in Table 2.

Production Example 9

In a glass flask equipped with a reflux condenser, a dropping funnel, a thermometer and a stirrer, chlorobenzene (160 g), the propylene polymer (40 g) as obtained in Production Example 3, and maleic anhydride (6 g) were added, the inside of the vessel was displaced with a nitrogen gas, and the temperature was then elevated to 110° C. After the temperature elevation, a chlorobenzene solution of PER-CUMYL D (dicumyl peroxide, manufactured by NOF Corporation) (2.8 g) was fed over 2 hours by using a metering pump, and stirring was then continued at that temperature for 3 hours, thereby achieving reaction. After completion of the reaction, the system was cooled to the vicinity of room temperature, acetone was added, and a precipitated polymer was separated by filtration. Moreover, precipitation with acetone and separation by filtration were repeated, and an ultimately obtained polymer was washed with acetone. After washing, the resulting polymer was dried in vacuo to obtain a modified polymer in a white powder form. The grafting rate and results of the measurement of physical properties of the resulting modified polymer are shown in Table 2.

Production Example 10

The same operations as in Production Example 5 were followed, except for using the propylene polymer as synthesized in Production Example 4. The grafting rate and results of the measurement of physical properties of the resulting modified polymer are shown in Table 2.

Production Example 11

The same operations as in Production Example 5 were followed, except for using the polypropylene of Reference Example 1 (UBETAC UT-2115). The grafting rate and results of the measurement of physical properties of the resulting modified polymer are shown in Table 2.

Production Example 12

The same operations as in Production Example 5 were followed, except for using the propylene copolymer of Reference Example 2 (TAFMER S4030). The grafting rate and results of the measurement of physical properties of the resulting modified polymer are shown in Table 2.

Production Example 14

The same operations as in Production Example 5 were followed, except for using the propylene copolymer as synthesized in Production Example 13. The grafting rate and results of the measurement of physical properties of the resulting modified polymer are shown in Table 2.

<Production of Polypropylene Copolymer and its Composition>

Example 1

In a glass flask equipped with a reflux condenser, a dropping funnel, a thermometer and a stirrer, 10 g of the maleic anhydride-modified polypropylene (content of maleic anhydride: 1.5% by weight) as obtained in Production Example 5 and 50 g of toluene were charged and then dissolved by elevating the temperature to 100° C. in an air stream. 0.2 g of 2-hydroxyethyl acrylate [compound (C1)], 0.05 g of 1,8-diazabicyclo[5.4.0]-7-undecene (DBU), and 0.02 g of hydroquinone monomethyl ether were added thereto, and the mixture was allowed to react at that temperature for 5 hours. As a result of infrared absorption spectral analysis of the resulting product, 2.0% by weight of 2-hydroxyethyl acrylate was added.

Next, in 60 g of a toluene solution of the resulting acid-modified polypropylene having 2-hydroxyethyl acrylate added thereto (solid content: 10 g), 12 g of n-butyl acrylate, 8 g of methyl methacrylate, 0.2 g of methacrylic acid, 0.2 g of 2,2'-azobis(2-methyl-propionitrile) (hereinafter referred to as "AIBN") as an initiator, and 70 g of toluene were charged, the temperature was elevated to 90° C. in terms of an inner temperature over about one hour in a nitrogen stream, and the mixture was allowed to react at that temperature for 2 hours. 0.3 g of AIBN was supplemented, and the mixture was allowed to react for 2 hours. 0.3 g of AIBN was supplemented, and the mixture was allowed to further react for 2 hours. Thereafter, the reaction mixture

TABLE 2

Production Examples 5 to 12 and 14

| | Item | Remark | Unit | Production Example 5 | Production Example 6 | Production Example 7 | Production Example 8 |
|---|---|---|---|---|---|---|---|
| Modification condition | Charge amount | Polymer | | Production Example 1 | Production Example 1 | Production Example 1 | Production Example 2 |
| | | | (part by weight) | 100 | 100 | 100 | The same as in Production Example 5 |
| | | Monomer | (part by weight) | Maleic anhydride 15 | Maleic anhydride 24 | Maleic anhydride 50 | |
| | | Solvent | (part by weight) | Toluene 400 | Toluene 400 | Toluene 400 | |
| | | Initiator | (part by weight) | PBI 7 | PBI 10 | PBI 30 | |
| | Temperature | | (° C.) | 110 | 110 | 110 | |
| Grafting rate | | | (% by weight) | 1.5 | 3.6 | 6.5 | 1.6 |

| | Item | Remark | Unit | Production Example 9 | Production Example 10 | Production Example 11 | Production Example 12 | Production Example 14 |
|---|---|---|---|---|---|---|---|---|
| Modification condition | Charge amount | Polymer | | Production Example 3 | Production Example 4 | Reference Example 1 | Reference Example 2 | Production Example 13 |
| | | | (part by weight) | 100 | The same as in Production Example 5 | The same as in Production Example 5 | The same as in Production Example 5 | The same as in Production Example 5 |
| | | Monomer | (part by weight) | Maleic anhydride 15 | | | | |
| | | Solvent | (part by weight) | Chlorobenzene 400 | | | | |
| | | Initiator | (part by weight) | DCPO 7 | | | | |
| | Temperature | | (° C.) | 130 | | | | |
| Grafting rate | | | (% by weight) | 1.5 | 1.5 | 1.7 | 1.5 | 1.6 |

In the table, PBI stands for PERBUTYL I, and DCPO stands for PERCUMYL D.

was cooled to obtain a transparent and uniform coating composition composed of a toluene solution containing 20% by weight of the polymer.

Example 2

In a glass flask equipped with a reflux condenser, a dropping funnel, a thermometer and a stirrer, 10 g of the maleic anhydride-modified polypropylene as obtained in Production Example 5 and 50 g of toluene were charged and then dissolved by elevating the temperature to 110° C. in an air stream. 0.2 g of glycidyl methacrylate, 0.05 g of DBU, and 0.02 g of hydroquinone monomethyl ether were added thereto, and the mixture was allowed to react at that temperature for 5 hours. As a result of infrared absorption spectral analysis of the resulting product, 2.1% by weight of glycidyl methacrylate was added.

Next, in 60 g of a toluene solution of the resulting acid-modified polypropylene having glycidyl methacrylate added thereto (solid content: 10 g), 6 g of n-butyl acrylate, 8 g of methyl methacrylate, 6 g of styrene, 0.2 g of methacrylic acid, 0.2 g of AIBN as an initiator, and 70 g of toluene were charged, the temperature was elevated to 90° C. in terms of an inner temperature over about one hour in a nitrogen stream, and the mixture was allowed to react at that temperature for 2 hours. 0.3 g of AIBN was supplemented, and the mixture was allowed to react for 2 hours. 0.3 g of AIBN was supplemented, and the mixture was allowed to further react for 2 hours. Thereafter, the reaction mixture was cooled to obtain a transparent and uniform coating composition composed of a toluene solution containing 20% by weight of the polymer.

Example 3

In a glass flask equipped with a reflux condenser, a dropping funnel, a thermometer and a stirrer, 3.1 g of dimethylaminoethyl methacrylate, 36.9 g of methyl methacrylate, and 160 g of isopropanol were added, and the temperature was elevated to 82° C. in a nitrogen stream. 0.6 g of AIBN was added thereto, and the mixture was allowed to react at that temperature for 6 hours. The temperature was dropped to 40° C., and 300 g of methanol was added, thereby completely crystallizing the product, followed by filtration. The product was dried at 60° C. for 4 hours by a vacuum dryer, thereby obtaining 22 g of a polymer.

A solution having 3 g of this polymer dissolved in 12 g of toluene was mixed with a solution prepared by dissolving 6 g of the maleic anhydride-modified polypropylene as obtained in Production Example 6 in 24 g of toluene and standing in an atmosphere at a humidity of 95% and 80° C. for one day, thereby ring opening the acid anhydride group (as a result of measuring a cyclized body of 1,780 cm$^{-1}$ and a ring opened body of 1,740 cm$^{-1}$ by infrared absorption spectrum, a rate of ring opening (=(abs 1740 cm$^{-1}$)/[(abs 1780 cm$^{-1}$)+(abs 1740 cm$^{-1}$)]×100 (%)) was 90%). Thereafter, the mixture was stirred at 50° C. for 2 hours to obtain a transparent, pale yellow and uniform coating composition composed of a toluene solution containing 20% by weight of the polymer.

Example 4

In a glass flask equipped with a reflux condenser, a dropping funnel, a thermometer and a stirrer, 1.9 g of dimethylaminoethyl methacrylate, 38.1 g of cyclohexyl methacrylate, and 160 g of isopropanol were added, and the temperature was elevated to 82° C. in a nitrogen stream. 0.6 g of AIBN was added thereto, and the mixture was allowed to react at that temperature for 6 hours. The temperature was dropped to 40° C., and 300 g of methanol was added, thereby completely crystallizing the formed polymer, followed by filtration. This product was dried at 60° C. for 4 hours by a vacuum dryer, thereby obtaining 24 g of a polymer.

A solution having 3 g of this polymer dissolved in 17 g of toluene was mixed with a solution prepared by dissolving 6 g of the maleic anhydride-modified propylene polymer as obtained in Production Example 5 in 34 g of toluene and standing in an atmosphere at a humidity of 95% and 80° C. for one day, thereby ring opening the acid anhydride group (as a result of measuring a cyclized body of 1,780 cm$^{-1}$ and a ring opened body of 1,740 cm$^{-1}$ by infrared absorption spectrum, a rate of ring opening (=(abs 1740 cm$^{-1}$)/[(abs 1780 cm$^{-1}$)+(abs 1740 cm$^{-1}$)]×100 (%)) was 90%). Thereafter, the mixture was stirred at 50° C. for 2 hours to obtain a transparent, pale yellow and uniform coating composition composed of a toluene solution containing 20% by weight of the polymer.

Example 5

A coating composition was obtained by following the same operations as in Example 1, except for using the maleic anhydride-modified propylene polymer as synthesized in Production Example 6.

Example 6

A coating composition was obtained by following the same operations as in Example 1, except for using the maleic anhydride-modified polypropylene as synthesized in Production Example 7.

Example 7

A coating composition was obtained by following the same operations as in Example 1, except for using the maleic anhydride-modified polypropylene as synthesized in Production Example 8.

Comparative Example 1

The same operations as in Example 1 were followed, except for using the maleic anhydride-modified polypropylene as synthesized in Production Example 9. However, a formed polymer was not dissolved in toluene and became a swollen material so that coating could not be achieved.

Comparative Example 2

A coating composition was obtained by following the same operations as in Example 1, except for using the maleic anhydride-modified polypropylene as synthesized in Production Example 10.

Comparative Example 3

The same operations as in Example 1 were followed, except for using the maleic anhydride-modified polypropylene as synthesized in Production Example 11. However, a formed polymer was not dissolved in toluene and became a swollen material so that coating could not be achieved.

Comparative Example 4

A coating composition was obtained by following the same operations as in Example 1, except for using the maleic anhydride-modified polypropylene as synthesized in Production Example 12.

Comparative Example 5

In a glass flask equipped with a reflux condenser, a dropping funnel, a thermometer and a stirrer, 10 g of the polypropylene as obtained in Production Example 1 and 50 g of toluene were charged and then dissolved by elevating the temperature to 50° C. in an air stream. Next, 12 g of n-butyl acrylate, 8 g of methyl methacrylate, 0.2 g of methacrylic acid, 0.2 g of AIBN as an initiator, and 70 g of toluene were charged, the temperature was elevated to 90° C. in terms of an inner temperature over about 30 minutes in a nitrogen stream, and the mixture was allowed to react at that temperature for 2 hours. 0.3 g of AIBN was supplemented, and the mixture was allowed to react for 2 hours. 0.3 g of AIBN was supplemented, and the mixture was allowed to further react for 2 hours. Thereafter, the reaction mixture was cooled to obtain a toluene solution containing 20% by weight of the polymer. However, one hour after standing, phase separation occurred so that a coating composition was not obtained.

Comparative Example 6

10 g of the modified polypropylene as obtained in Production Example 5 was dissolved in 40 g of toluene to obtain a transparent and uniform coating composition composed of a toluene solution containing 20% by weight of the polymer.

Example 8

A coating composition was obtained by following the same operations as in Example 1, except for using the maleic anhydride-modified propylene/1-hexene copolymer as synthesized in Production Example 14.

Example 9

In a glass flask equipped with a reflux condenser, a dropping funnel, a thermometer and a stirrer, 0.8 g of dimethylaminoethyl methacrylate, 39.2 g of methyl methacrylate, and 160 g of isopropanol were added, and the temperature was elevated to 82° C. in a nitrogen stream. 0.6 g of AIBN was added thereto, and the mixture was allowed to react for 6 hours. The temperature was dropped to 40° C., and 300 g of methanol was added, thereby completely crystallizing the formed polymer, followed by filtration. This product was dried at 60° C. for 4 hours by a vacuum dryer, thereby obtaining 22 g of a polymer.

A solution having 7 g of this polymer dissolved in 28 g of toluene was mixed with a solution prepared by dissolving 3 g of the maleic anhydride-modified polypropylene as obtained in Production Example 6 in 12 g of toluene and standing in an atmosphere at a humidity of 95% and 80° C. for one day, thereby ring opening the acid anhydride group (as a result of measuring a cyclized body of 1,780 cm$^{-1}$ and a ring opened body of 1,740 cm$^{-1}$ by infrared absorption spectrum, a rate of ring opening (=(abs 1740 cm$^{-1}$)/[(abs 1780 cm$^{-1}$)+(abs 1740 cm$^{-1}$)]×100 (%)) was 90%). Thereafter, the mixture was stirred at 50° C. for 2 hours to obtain a transparent, pale yellow and uniform coating composition composed of a toluene solution containing 20% by weight of the polymer.

Example 10

In a glass flask equipped with a reflux condenser, a dropping funnel, a thermometer and a stirrer, 10 g of the maleic anhydride-modified polypropylene as obtained in Production Example 5 and 20 g of toluene were charged and then dissolved by elevating the temperature to 100° C. in an air stream. 1 g of 2-hydroxyethyl acrylate, 0.4 g of dimethylbenzylamine, and 0.02 g of hydroquinone monomethyl ether were added thereto, and the mixture was allowed to react at that temperature for 5 hours. 0.5 g of the solution was taken out and reprecipitated and washed with acetone. As a result of infrared absorption spectral analysis of the resulting product, 0.4% by weight of 2-hydroxyethyl acrylate was added.

Next, in 30 g of the 2-hydroxyethyl acrylate-added polypropylene toluene solution (solid content: 10 g), 9 g of n-butyl methacrylate, 9 g of methyl methacrylate, 0.2 g of V-59 (manufactured by Wako Pure Chemical Industries, Ltd.) as an initiator, and 70 g of toluene were charged, the temperature was elevated to 85° C. in terms of an inner temperature over about one hour in a nitrogen stream, and the mixture was allowed to react at that temperature for 3 hours. 0.2 g of V-59 was supplemented, and the mixture was allowed to react for 3 hours. Thereafter, the reaction mixture was cooled to obtain a transparent and uniform coating resin composition composed of a toluene solution containing 20% by weight of the polymer having an OH value of 20 mg-KOH/g.

Example 11

In a glass flask equipped with a reflux condenser, a dropping funnel, a thermometer and a stirrer, 10 g of the maleic anhydride-modified polypropylene as obtained in Production Example 6, 5 g of a polyester polyol P-2010 (manufactured by Kuraray Co., Ltd.), and 20 g of toluene were charged and then dissolved by elevating the temperature to 110° C. in an air stream. 0.2 g of dimethylbenzylamine was added thereto, and the mixture was allowed to react at that temperature for 5 hours. 40 g of toluene was added to obtain a transparent and uniform coating resin composition composed of a toluene solution containing 20% by weight of the resin.

Example 12

The coating composition as produced in Example 10 was used and evaluated as a coating material. The results are shown in Table 4.

Comparative Example 7

10 g of the maleic anhydride-modified propylene polymer as synthesized in Production Example 6 was dissolved in 40 g of toluene to produce a coating composition, which was then evaluated as a coating material. The results are shown in Table 4.

<Evaluation of Physical Properties of Coating Composition>

With respect to the coating compositions as obtained in the foregoing Examples and Comparative Examples, physical properties thereof were evaluated in the following methods. The evaluation results are summarized and shown in Table 3.

<Preparation of Specimen>

Substrate Example

Polypropylene MA3U (propylene homopolymer, MFR 15 g/10 min (at 230° C. under a load of 21.18 N)) as manufactured by Japan Polychem Corporation was molded into a test substrate having a wall thickness of 3 mm and a size of 150 mm×70 mm at a molding temperature of 240° C. by using a screw in-line injection molding machine.

<Evaluation of Physical Properties>

(1) Solubility:

A solubility test was determined by the following method. The solution (coating composition) as prepared in each of the Examples is heated for one hour in a thermostat at 50° C. and after spontaneously cooling to room temperature, is allowed to stand for one hour and then filtered by an SUS-made wire net of No. 400. A material remaining on the wire net is defined as an insoluble matter, and a material passing therethrough as a solution is defined as a soluble matter, and the both are dried at 80° C. under not higher than 1 mmHg for 4 hours by using a vacuum dryer. Weighing is carried out, and a fraction of the insoluble matter is calculated.

(2) Low-temperature Fluidity:

The coating composition was charged in a sample bottle and allowed to stand in a low-temperature incubator set up at −10° C., and the state after elapsing for one week was observed.

Evaluation Criteria
A: Flowable
B: Non-flowable (3) Adhesion:

<Preparation of Specimen>

(3-1) Evaluation as Primer (Adehsion-1)

The coating composition as obtained in each of the Examples and Comparative Examples was spray coated on the injection molded substrate (the surface of which had been cleaned up with isopropyl alcohol) as prepared in the Substrate Example. Incidentally, the coating amount was regulated at 3 to 5 g/m$^2$. Next, the molded substrate after coating was allowed to stand at 25° C. for 10 minutes and then dried at 80° C. for 30 minutes in a safety ventilation dryer. Next, after allowing this dried article to stand at 25° C. for one hour, a base coat as prepared by blending an acrylic polyol urethane paint RETAN PG80III (a trade name, manufactured by Kansai Paint Co., Ltd.) with a prescribed amount of a curing agent and adjusting the viscosity thereof at 12 to 13 seconds with an exclusive thinner by using a No. 4 Ford cup was spray coated on the coating film in a coating amount after drying of from 50 to 60 g, followed by baking at 100° C. for 30 minutes in a safety ventilation dryer. The baked article was further allowed to stand at 25° C. for 24 hours and then subjected to interlaminar adhesion test.

(3-2) Evaluation as Coating Material (Adhesion-2)

The coating composition as obtained in each of the Examples and Comparative Examples was spray coated on the injection molded substrate (the surface of which had been cleaned up with isopropyl alcohol) as prepared in the Substrate Example. Incidentally, the coating amount was regulated at 10 to 20 g/m$^2$. Next, the molded substrate after coating was allowed to stand at 25° C. for 10 minutes and then dried at 80° C. for 30 minutes in a Safe Van dryer.

<Adhesion Test>

The interlaminar adhesion test was carried out according to a cross-cut test as described in JIS K5400, i.e., a specimen provided with cross-cuts was prepared, CELLOTAPE (a trade name) as manufactured by Nichiban Co., Ltd. was stuck onto the cross-cuts of the specimen and then rapidly drawn and peeled away in the vertical direction, and the number of cross-cuts which had not been peeled away among 100 cross-cuts was counted and defined as an index of the adhesion.

(4) Water Resistance Test:

Likewise the preparation of a specimen in the foregoing (3), each of the coating compositions was used as a primer, and a base coat was coated on the coating film and baked, followed by ageing at room temperature, thereby obtaining a coated material. The coated material was dipped in warm water kept at 40° C. for 10 days and then subjected to a peeling test in the same manner as in the foregoing adhesion test.

(5) Non-tackiness Test:

The non-tackiness was evaluated by a finger tackiness test.

Evaluation Criteria
A: Excellent in non-tackiness
B: Slightly tacky
C: Tacky (6)—(Compatibility-1)

HITALOID 3904, manufactured by Hitachi Chemical Co., Ltd. (viscosity: 3,400 mPa·s (resin concentration: 50% by weight, xylene: 40% by weight, butyl acetate: 10% by weight, temperature: 25° C.), solubility parameter: 10.3 (cal/cm$^3$)$^{1/2}$) as an acrylic resin was diluted with toluene such that the solid content became 20%. This diluted solution and the coating composition were mixed in a solution weight ratio of 1/1, thereby preparing a solution. This solution was scooped up by a spatula while mixing and thinly coated on a glass plate. After drying at room temperature, the state of the film was visually observed.

Evaluation Criteria
A: Uniform
B: Cloudy
C: Separated (6)—(Compatibility-2)

HITALOID 3904, manufactured by Hitachi Chemical Co., Ltd. as an acrylic resin was diluted with toluene such that the solid content became 12%. This diluted solution and the coating composition were mixed in a solution weight ratio of 1/1, thereby preparing a solution. A transmittance (at 650 nm) of the solution was measured.

Evaluation Criteria
A: 80% or more
B: 50% or more but less than 80%
C: Less than 50%

TABLE 3

Examples 1 to 11 and Comparative Examples 1 to 6

|  | Example 1 | Example 2 | Example 3 | Example 4 | Example 5 | Example 6 | Example 7 |
|---|---|---|---|---|---|---|---|
| (A)/(B) | 1/2 | 1/2 | 2/1 | 2/1 | 2/1 | 2/1 | 2/1 |
| Insoluble matter (solubility (%)) | <1 | <1 | <1 | <1 | <1 | <1 | <1 |
| Low-temperature fluidity | A | A | A | A | A | A | B |
| Adhesion-1 | 100/100 | 100/100 | 100/100 | 100/100 | 90/100 | 60/100 | 100/100 |
| Water resistance | 100/100 | 100/100 | 100/100 | 100/100 | 90/100 | 60/100 | 100/100 |
| Non-tackiness | A | A | A | A | A | B | A |
| Compatibility-1 | A | A | A | A | A | A | A |
| Compatibility-2 | B | B | A | A | A | A | B |

|  | Comparative Example 1 | Comparative Example 2 | Comparative Example 3 | Comparative Example 4 | Comparative Example 5 | Comparative Example 6 |
|---|---|---|---|---|---|---|
| (A)/(B) | 1/2 | 1/2 | 1/2 | 1/2 |  | 1/0 |
| Insoluble matter (solubility (%)) | >98 | <1 | 25 | Filtration was impossible. | Measurement was impossible. | <1 |
| Low-temperature fluidity | Measurement was impossible. | A | Measurement was impossible. | B | Measurement was impossible. | C |
| Adhesion-1 | Coating was impossible. | 20/100 | Coating was impossible. | 20/100 | Coating was impossible. | 100/100 |
| Water resistance |  | 20/100 |  | 20/100 |  | 100/100 |
| Non-tackiness |  | C |  | A | C | A |
| Compatibility-1 |  | A |  | A | C | C |
| Compatibility-2 | C | A | C | C | C | C |

|  | Example 8 | Example 9 | Example 10 | Example 11 |
|---|---|---|---|---|
| (A)/(B) | 1/2 | 7/3 | 1/1 | 2/1 |
| Insoluble matter (solubility (%)) | <1 | <1 | <1 | <1 |
| Low-temperature fluidity | A | A | A | A |
| Adhesion-1 | 100/100 | 100/100 | 100/100 | 100/100 |
| Water resistance | 100/100 | 100/100 | 100/100 | 100/100 |
| Non-tackiness | A | A | A | A |
| Compatibility-2 | B | A | A | B |

TABLE 4

Example 12 and Comparative Example 7

|  | Example 12 | Comparative Example 7 |
|---|---|---|
| (A)/(B) | 1/1 | 1/0 |
| Adhesion-2 | 100/100 | 100/100 |
| Non-tackiness | A | B |

While the invention has been described in detail and with reference to specific embodiments thereof, it will be apparent to one skilled in the art that various changes and modifications can be made therein without departing from the spirit and scope thereof.

This application is based on a Japanese patent application filed Feb. 21, 2003 (Japanese Patent Application No. 2003-043675), the entire contents thereof being hereby incorporated by reference.

INDUSTRIAL APPLICABILITY

Since the polypropylene copolymer of the invention has good compatibility with polar resins and excellent adhesion to crystalline polyolefin-based polymers, it can be used as a surface treating agent, an adhesive, a paint, a compatibilizing agent between a polyolefin and a polar resin, etc. and is extremely useful.

The invention claimed is:

1. A polypropylene copolymer which has a polymer principal chain (A) that is derived from a propylene-based polymer having the following characteristics (1) and (2) and which has a functional group and which further has a side chain containing a polymer chain (B) which is different from the principal chain (A), wherein the weight ratio of (A)/(B) is in the range of 20/1 to 1/20:

(1) in a $^{13}$C-CMR spectrum of the propylene-based polymer whose sequential propylene units are formed by head-to-tail bonding, when the peak ($S_1$) in the spectrum that is attributable to the carbon atom of the methyl group of each propylene unit in a pentad sequence of propylene monomer units in the mmmm configuration appears at 21.8 ppm, the ratio ($S_1/S$) of the area of peak $S_1$ to the total area (S) of all peaks that appear in the spectrum from 19.8 ppm to 22.2 ppm ranges from 20 to 60%; and when an area $S_2$ of a peak derived from a pentad sequence of mmmr having a peak top located at about 21.5 to 21.7 ppm, the relationship of $\{(4+2S_1/S_2)>5\}$, and (2) the melting point [Tm] of the propylene-based polymer, as measured by a differential scanning calorimeter, is not higher than 100° C., or the heat required for melting of the crystal of the polymer is not at a value of 5 J/g or more.

2. The polypropylene copolymer according to claim 1, wherein the functional group-containing propylene-based polymer comprises a modified propylene-based polymer of a propylene-based polymer having said characteristics (1) and (2) and not having a functional group.

3. The polypropylene copolymer according to claim 2, wherein the modified propylene-based polymer is a propylene-based polymer that is modified with an acid compound having a carboxylic acid group or a dicarboxylic acid anhydride group.

4. The polypropylene copolymer according to claim 1, wherein the polymer chain (B) of the side chain is a polymer chain in which repeating units of the polymer chain are formed by addition reactions, ester bonds, or ether bonds.

5. The polypropylene copolymer according to claim 1, wherein the polymer chain (B) of the side chain contains a (meth)acrylic polymer chain.

6. The polypropylene copolymer according to claim 5, wherein the polymer principal chain (A) comprises an acid-modified propylene-based polymer, wherein the modifying group is a carboxylic acid group or a dicarboxylic acid anhydride group; and wherein the side chain containing the (meth)acrylic polymer chain (B) is connected via a covalent bond or an ionic bond with a group that is capable of reacting with the carboxylic acid group or the dicarboxylic acid anhydride group.

7. The polypropylene copolymer according to claim 1, wherein the propylene-based polymer is produced by a single site catalyst.

8. The polypropylene copolymer according to claim 6, wherein the group that is capable of reacting with the carboxyl acid group or a dicarboxylic acid anhydride group of the acid-modified propylene-based polymer is a moiety selected from the group consisting of an amino group, a hydroxyl group, an epoxy group, and an isocyanate group.

9. The polypropylene copolymer according to claim 3, wherein the acid-modified propylene-based polymer has an acid content ranging from 0.01% by weight to 5% by weight.

10. The polypropylene copolymer according to claim 1, wherein the polypropylene copolymer has the following characteristics (a) to (c):
  (a) when dissolved in toluene at 25° C. together with an acrylic resin in a weight ratio of 50/50 and in a concentration of solids of 12% by weight, the transmittance of light through the solution at a wavelength of 650 nm is 80% or more,
  (b) when dissolved in toluene at 25° C. in a concentration of 10% by weight, the content of insoluble matter is not more than 1% by weight based on the entire weight of the polymers, and
  (c) adhesion by a cross-cut tape adhesion test to a polypropylene substrate is 50/100 or more.

* * * * *